United States Patent
Taylor et al.

(10) Patent No.: US 12,244,938 B2
(45) Date of Patent: Mar. 4, 2025

(54) BRIGHTNESS BASED CHROMATICITY WEIGHTING FOR IMPROVED ILLUMINANT COLOR ESTIMATION FOR AUTO WHITE BALANCING

(71) Applicant: NVIDIA Corporation, Santa Clara, CA (US)

(72) Inventors: Douglas Taylor, Santa Clara, CA (US); Animesh Khemka, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 89 days.

(21) Appl. No.: 18/078,667

(22) Filed: Dec. 9, 2022

(65) Prior Publication Data
US 2024/0196104 A1    Jun. 13, 2024

(51) Int. Cl.
*H04N 23/88* (2023.01)
*G06T 7/90* (2017.01)
*H04N 9/77* (2006.01)
*H04N 23/71* (2023.01)
*H04N 23/76* (2023.01)

(52) U.S. Cl.
CPC ............... *H04N 23/88* (2023.01); *G06T 7/90* (2017.01); *H04N 9/77* (2013.01); *H04N 23/71* (2023.01); *H04N 23/76* (2023.01); *G06T 2207/10024* (2013.01); *G06T 2207/20021* (2013.01)

(58) Field of Classification Search
CPC .......... H04N 23/88; H04N 9/77; H04N 23/71; H04N 23/76; G06T 7/90; G06T 2207/10024; G06T 2207/20021
See application file for complete search history.

(56) References Cited

U.S. PATENT DOCUMENTS

| | | | |
|---|---|---|---|
| 6,504,952 B1 * | 1/2003 | Takemura | H04N 1/6002 382/167 |
| 2009/0002518 A1 * | 1/2009 | Nakamura | H04N 23/88 348/223.1 |

* cited by examiner

*Primary Examiner* — Yogesh K Aggarwal
(74) *Attorney, Agent, or Firm* — Lowenstein Sandler LLP

(57) ABSTRACT

Apparatuses, systems, and techniques for white balancing an image are presented. In at least one embodiment, a chromaticity-based weighting function is determined based at least on an estimated scene brightness of the image and applied to exclude or minimize the impact of large colored portions or objects within an image when estimating an illuminant color.

20 Claims, 22 Drawing Sheets

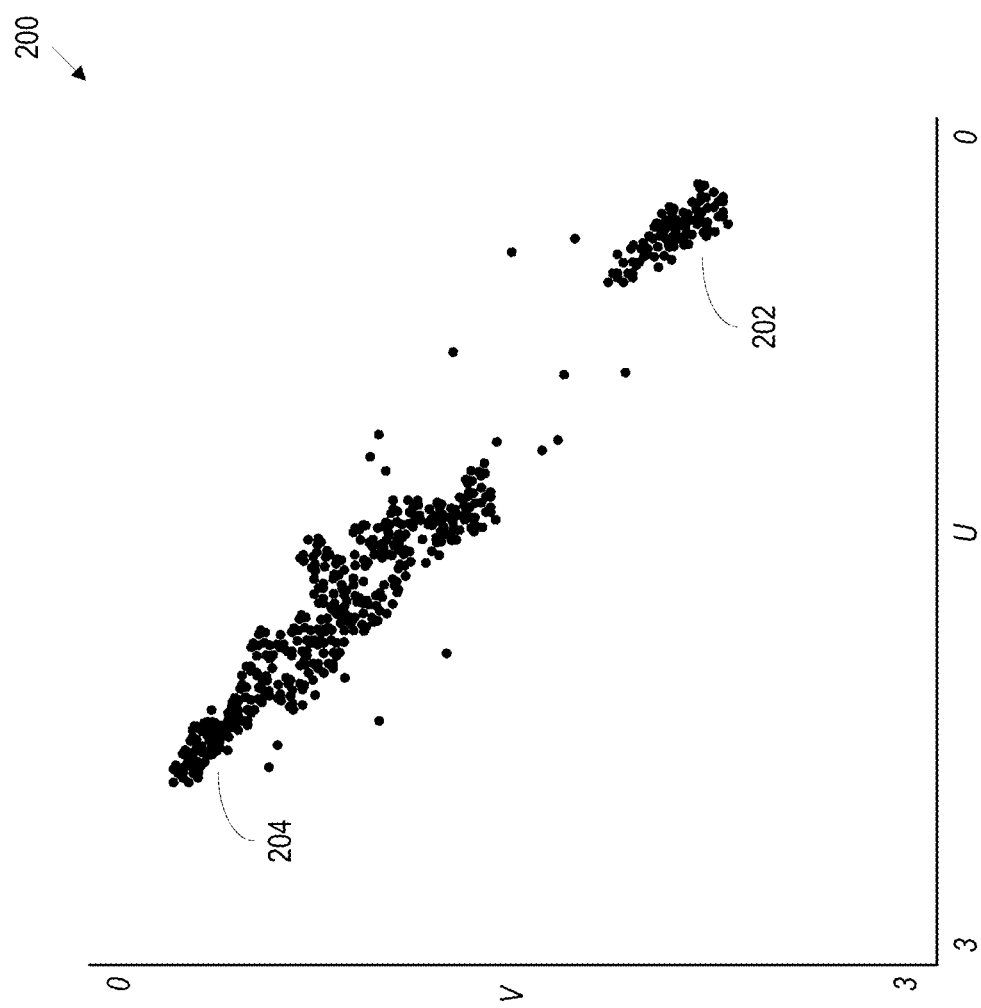

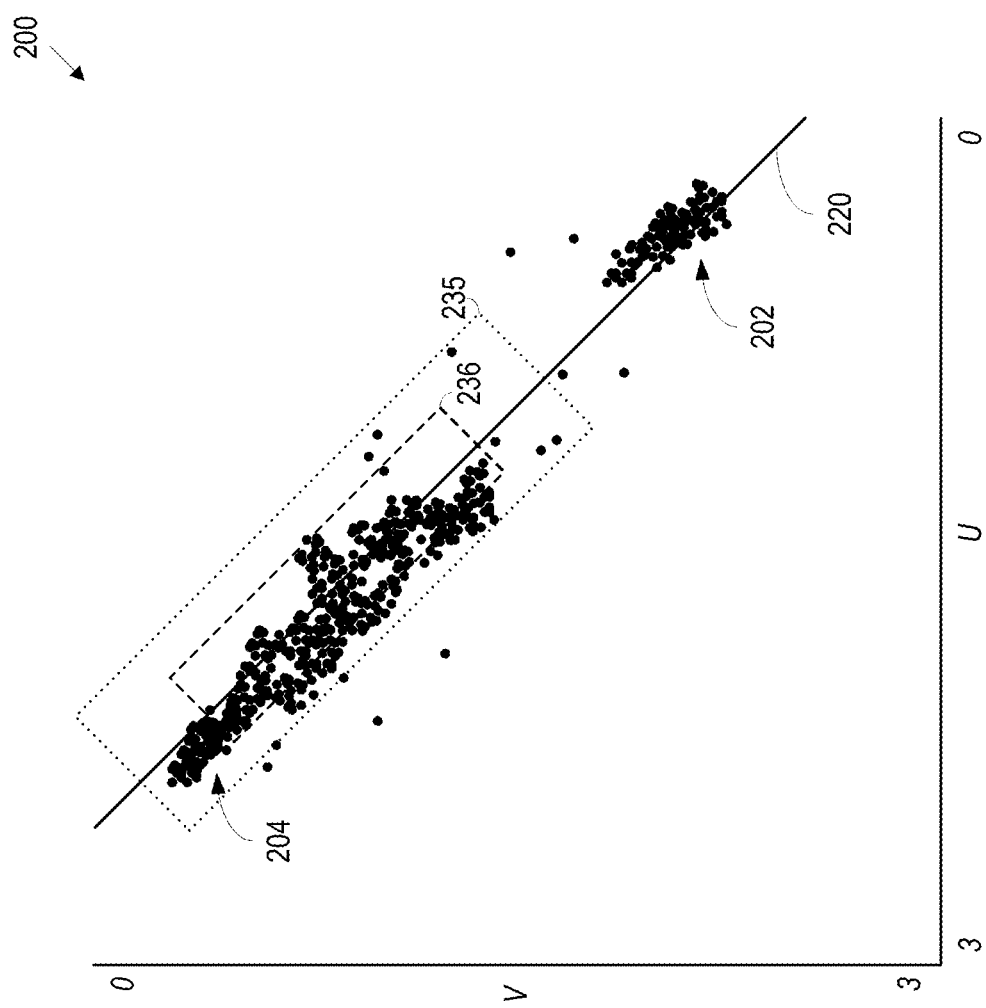

BRIGHTNESS BASED CHROMATICITY WEIGHTING FOR IMPROVED ILLUMINANT COLOR ESTIMATION FOR AUTO WHITE BALANCING

TECHNICAL FIELD

Embodiments of the disclosure generally relate to image processing, and more specifically, to improved illuminant color estimation techniques for auto white balancing.

BACKGROUND

When an imaging device—such as a digital camera—captures an image, the apparent color of the captured scene will depend on the color of the light that illuminates the object. For example, scenes illuminated by artificial incandescent light (e.g., using a tungsten light bulb) may have a warm color cast, appearing more yellow or orange, whereas scenes illuminated with natural light (e.g., during daylight or from an overcast sky) may have a cooler color cast, appearing more bluish. A process known as white balancing may be performed on a digital image to remove undesirable color casts caused by environmental lighting.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A illustrates an example plot of a chromaticity space including a set of converted image points in accordance with some embodiments of the present disclosure;

FIG. 2E illustrates an example plot of a chromaticity space including the boundary outlines of a combined weighting function over a set of converted points in accordance with some embodiments of the present disclosure;

DETAILED DESCRIPTION

Figure 1:
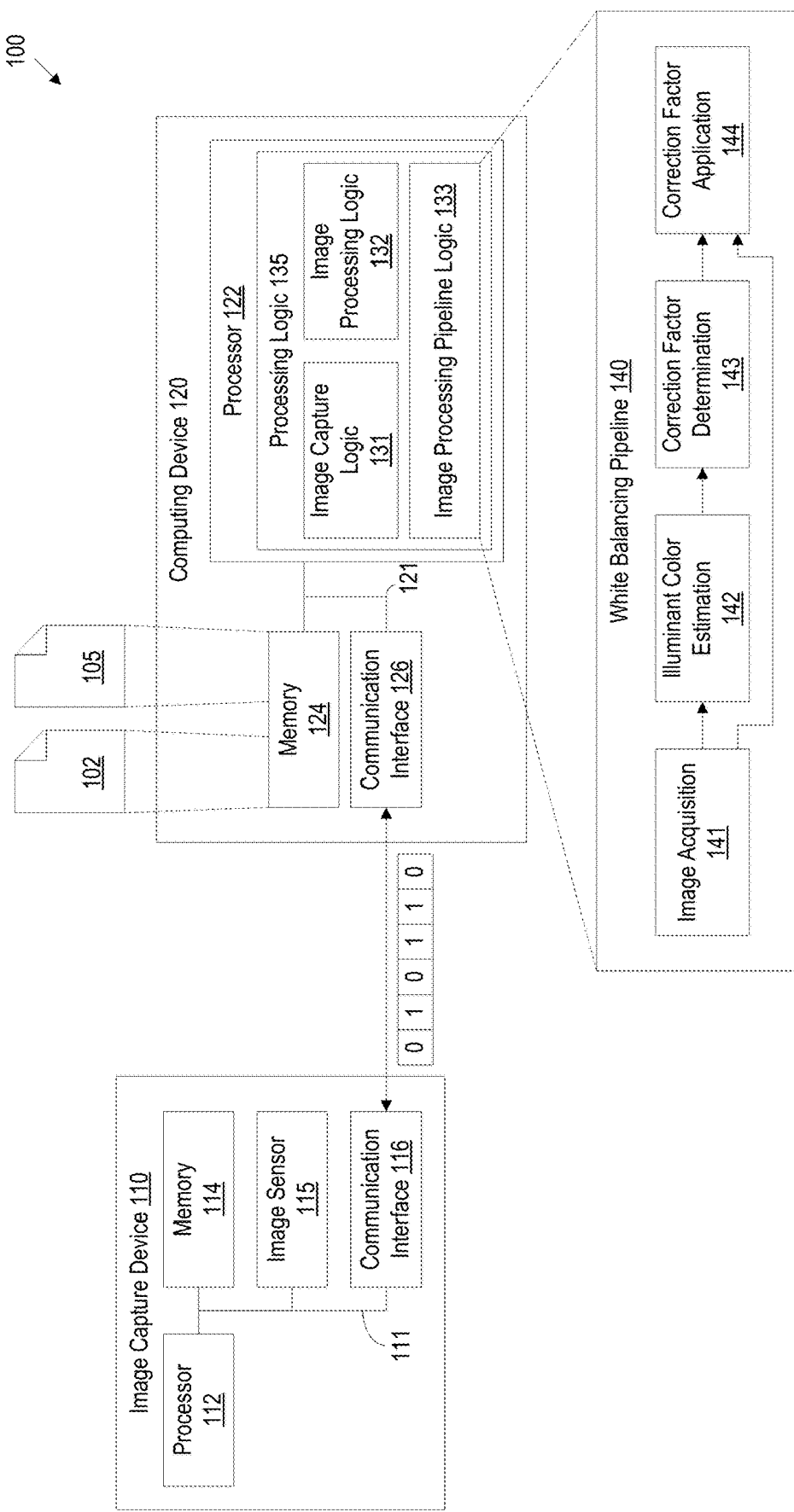
FIG. 1 illustrates an example computing environment in accordance with some embodiments of the present disclosure.

The apparent color of a scene captured in an image (e.g., by a digital camera or other imaging device) will depend on the color of the light that illuminates the scene. For example, scenes illuminated by unnatural incandescent light (e.g., using a tungsten light bulb) may have a warm color cast, appearing more yellow or orange, whereas scenes illuminated with natural light (e.g., from an overcast sky) may have a cooler color cast, appearing more bluish. A process known as auto white balancing can be performed on a digital image to remove undesirable color casts caused by environmental lighting. Auto white balancing typically involves two steps. First, the illuminant color of a scene captured in an image is estimated using an illuminant estimation algorithm. Second, the captured image is corrected based on the estimated illuminant color. Illuminant estimation techniques are frequently premised on a statistical hypothesis or rely on image statistics to estimate the illuminant color of a scene.

One popular approach to illuminant estimation is the "gray world" method, which assumes that the average irradiance of a scene captured in an image is achromatic (e.g., "gray"), such that the average image color may serve as an estimation of the illuminant color for the captured scene. The color of the image may then be adjusted based on the estimated illuminant color, for example, by applying a gain to each color channel of the image. Conventional gray world methodologies, however, are unable to accurately estimate the color of an illuminant in a number of critical scenarios. The gray world method, for instance, is unable to correctly estimate an illuminant color in images having large colored regions or objects. By way of example, in an automotive context, images captured by a vehicle camera system may be dominated by a brightly colored vehicle passing and/or large portions of blue sky. In such cases, the average image color is far from gray, and the illuminant color estimated using traditional gray world methodologies is overly biased toward the color of the region or object.

While other statistical approaches for illuminant estimation exist—e.g., including the white-patch hypothesis, the bright pixels method, the shades-of-gray method, the gray edges method, the weighted gray edges method, the gray pixel method, and the grayness index—such estimation techniques suffer from similar, additional, or alternative drawbacks. Furthermore, such methods are not always reliably performed (e.g., where the underlying statistics are unreliable), forcing imaging systems to fall back to alternative methods of illuminant estimation. Imaging systems, for example, may rely upon the last known illuminant color (e.g., that was reliably estimated) or a default value that is manually set. But many applications are stateless in nature such that a last known illuminant color is unavailable, and the use of a single default color may frequently provide unsatisfactory results.

Embodiments of the present disclosure aim to address the above-mentioned limitations by employing a chromaticity-based weighting function to exclude or minimize the impact of the large colored regions or objects within an image when estimating an illuminant color. In some embodiments, the weighting function may define a set of weighting factors to be applied to an image around the Planckian Locus such that non-neutral portions of the image—like large colored regions or objects—are given low or zero weight. The weighting function, for example, may define a weighting distribution about a "gray line" (e.g., an approximation of the Planckian Locus for a particular imaging device or sensor) that may be parameterized in terms of color temperature (along the gray line) and tint (orthogonal to the gray line).

Because the gray line may span a broad range of color temperatures (e.g., wider than the range of possible illuminants for a particular scene), in some embodiments, the weighting function may be further tuned for different lighting conditions (e.g., a naturally lit scene, or an artificially illuminated scene) based on the embodiment and its application. For example, because it has been observed that emitted radiation power of a black body increases as color temperature increases, in some cases, it may be assumed that brightness tends to be directly associated with color temperature—brighter outdoor daylight lighting, for instance, tends to be associated with higher color temperatures, whereas dimmer indoor or lowlight illumination tends to be associated with lower color temperatures—and the weighting function may be further parametrized based on a scene brightness. The weighting function, for example, may define a set of weighting distributions, each weighting distribution being defined for a particular scene brightness (e.g., associated with certain lighting conditions). The weighting distribution applied to an image may then be determined based on an estimated scene brightness of the image. After the weighting function has been applied to the image, an average image color may be determined, which may then be projected onto the gray line to estimate an illuminant color of the scene. The illuminant color may then be used to determine and apply white balance correction factors to white balance the image. The white balancing techniques employed in embodiments of the present disclosure may have much greater color accuracy for scenes dominated by particular bright regions and/or objects than white balancing performed using conventional techniques (e.g., such as the gray word method).

While embodiments of the present disclosure provide a robust estimation of illuminant color—that is particularly effective when dealing with images having large colored regions or objects—there may be situations in which the underlying computations or statistics on which it is based may not be entirely reliable (e.g., where they are based on a small number or amount of pixels). In some cases, for example, the use of a weighting function may result in a large number of image pixels being excluded or given little weight, such that the weighted average image color used to estimate the illuminant color may not be reliable or effective. Rather than falling back to a last known illuminant color or default corrective factors, which may not be available or may produce unsatisfactory results, embodiments of the present disclosure may look to other illuminant estimation techniques, which may not rely on the same statistics and thus may be more reliably performed. In some embodiments, for example, a soft thresholding method may be employed, whereby the illuminant color estimation (or corrective white balance gains) produced by a first technique is blended with that produced by a second technique based on a level of confidence in the results of the first technique. This process may be repeated for additional white balancing techniques. Ultimately, if no auto white balance technique can be reliably employed, the process may fall back to a pseudo-manual method where the corrective white balance gains are determined based on a set of manually defined corrective white balance gains (e.g., defined for varying brightnesses) and an estimated scene brightness. Such white balance fallback techniques may be used with or without employing the above-described chromaticity weighting-based white balance techniques. The white balance fallback techniques, such as those described with respect to some embodiments of the present disclosure, may not rely on a previous white balance determination or result, and thus may be relied upon in systems that are stateless in nature. Furthermore, such white balance fallback techniques produce greater color accuracy than traditional fallback methods that rely on a single set of manually defined white balance gains.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

With reference to FIG. 1, FIG. 1 illustrates an example computing environment 100 in accordance with some embodiments of the present disclosure. The computing environment 100 may include an image capture device 110 and a computing device 120 for processing images captured by the image capture device 110, including for white balancing the image.

The image capture device 110 may take a variety of forms, including for example, a digital camera, a video camera, or a camera module that may be connected to, or integrated within, another device (e.g., a mobile phone, laptop computer, robot, aerial drone, smart appliance, etc.). The image capture device 110 may include various optical components (e.g., a lens, mirror, shutter, etc.) and an image sensor 115 that the image capture device 110 may use to capture an image of a scene. The image sensor 115 may include any of a variety of optical sensors, including a charge-coupled device (CCD) or an active-pixel sensor (APS), such as a complementary metal-oxide-semiconductor (CMOS) sensor. The image sensor 115 may contain an array of picture elements (pixels) made up of photosensitive elements (e.g., photo-diodes, phototransistors, photo-gates, or the like), micro-lenses, and/or micro-electronic components (e.g., amplifying and switching components). The photosensitive elements may receive and convert electromagnetic energy (e.g., visible light) focused upon the elements (e.g., through a lens or other optics) into a digital signal (or an analog signal that is converted into a digital signal using an analog-to-digital converter (ADC)) that can be processed and/or stored by the image capture device 110.

The image sensor 115 may also include a color filter array (CFA), composed of a mosaic of tiny color filters (e.g., polymer filters), placed over the pixel array. Each color filter may reflect and/or absorb undesired color wavelengths such that each image sensor pixel is sensitive to a specific color wavelength. A Bayer filter, for example, may isolate red, green, and blue wavelengths using alternating red (R) and green (G) filters for odd rows and alternating green (G) and blue (B) filters for even rows. In other cases, a CFA can be made with complementary color filters such as cyan, magenta, and yellow, or any other color system. A full-color image (e.g., with intensities of all colors represented at each pixel) may be reconstructed from a captured image by performing a demosaicing algorithm (also known as, color reconstruction or CFA interpolation).

In embodiments, the output produced by the image sensor 115 may be in a unique sensor color space (e.g., a color space of the image sensor 115). That is, the output produced by the image sensor 115 may reflect the unique response characteristic of the image sensor 115, for example, on account of errors or biases in the image sensor due to fabrication and/or processing variations (e.g., pixel response variations, color filter misalignment, variations in filter transmission coefficients, etc.).

A color calibration process can be performed to characterize the color response characteristics of the image sensor 115, which can then be used to assist with processing images captured by the image sensor 115 (e.g., when performing auto white balancing). The color calibration process, for example, may involve measuring the response of the image sensor 115 with respect to a reference scene or object, having one or more known colors (e.g., middle-gray, primary colors, etc.), illuminated by a known illuminant (or a set of known illuminants). The sensor response may be captured and stored by the image capture device 110 and processed by the image capture device 110 (or sent to and processed by computing device 120) to produce a set of one or more color calibration points. In some embodiments, for example, color calibration may be performed by capturing images of a gray card (e.g., a neutral gray card having a flat reflectance spectrum) using different forms of artificial lighting (e.g., incandescent, fluorescent, or LED lighting) with varying correlated color temperatures (or "color temperatures"). The captured images may be processed to produce a set of gray calibration points (e.g., a set of one or more RGB triplets), each point reflecting the image sensor 115 response for a neutral gray color for a particular color temperature.

A brightness calibration process can also be performed to characterize the brightness response characteristics of the image sensor 115, which can then be used to assist with processing images captured by the image sensor 115 (e.g., when estimating a scene brightness of an image). The brightness calibration process, for example, may involve measuring the response of the image sensor 115 with respect to a set of known illuminance values. The sensor response may be captured and stored by the image capture device 110 and processed by the image capture device 110 (or sent to and processed by computing device 120) to produce a brightness calibration factor, which may characterize the relationship between a brightness response of the image sensor 115 and a device independent measure of illuminance.

In some embodiments, for example, brightness calibration may be performed by capturing images of a scene at different known lux values, which may be processed to produce the brightness calibration factor. In some embodiments, for instance, an average value of a green color component may be computed for each image, and a relationship (parameterized by a brightness calibration factor) may be determined between the average green channel values and the corresponding known lux values (e.g., by performing a regression analysis). In some embodiments, the average green channel values may be adjusted based on an exposure of the image sensor 115 in capturing the image (e.g., by dividing the average value by an exposure time and gain product) before the brightness calibration factor is determined. The brightness calibration factor may allow the brightness response of an image sensor to be converted into a lux value, which may allow for better system tuning (e.g., better tuning of a weighting function) as it can be performed in a device independent manner.

The image capture device 110 may also include one or more processors (e.g., a controller, digital signal processor (DSP), image signal processor (ISP), etc.), such as processor(s) 112, and a memory(ies) 114 (e.g., volatile or non-volatile memory). The processor(s) 112, memory(ies) 114, and image sensor(s) 115 may be coupled to and communicate over communication bus(es) 111. The processor 112 may operate to control image sensor 115 (e.g., by exchanging control signaling over communication bus 111) and may receive data output from the image sensor(s) 115 (e.g., over communication bus 111), which it may process and store in memory(ies) 114.

The processor 112, for example, may direct the image sensor 115 to capture an image of a scene, and in response, the image sensor 115 may return data corresponding to the determined intensity of light (e.g., as measured by the photosensitive elements of the image sensor 115). The processor 112 may store the raw sensor data along with relevant metadata information in memory 114 (e.g., in a defined file format). The metadata information may provide details regarding the image (e.g., resolution, color space, etc.), image capture device 110 and its settings (e.g., make and model, orientation, aperture, shutter speed, focal length, metering mode, and ISO speed), and/or other relevant information (e.g., date, time, and/or location of capture). In some embodiments, the processor 112 may process the raw sensor data (e.g., by performing a demosaicing algorithm) before or after it is stored in memory 114.

The image capture device 110 may also include a communication interface 116 coupled to communication bus 111, which the processor 112 can use to communicate with another device, such as computing device 120. The image capture device 110, for example, may include a Camera Serial Interface (CSI), an Ethernet or Wi-Fi interface, or other communication interface over which image data and calibration data can be communicated to computing device 120.

The computing device 120 may include one or more processors (e.g., a digital signal processor (DSP), image signal processor (ISP) etc.), such as processor 122, a memory 124 (e.g., volatile or non-volatile memory), and a communication interface 126. The processor 122, memory 124, and communication interface 126 may be coupled to and communicate over communication bus 121. The processor 122 may include a number of processing logic components 135 that can be used to perform different processes and/or operations. In some embodiments, for example, the processor 122 may include image capture logic 131, image processing logic 132, and image processing pipeline logic 133, which are discussed in further detail herein.

The image capture logic 131 may be used by the processor 122 of the computing device 120 to capture image data from an image source. The image capture logic 131, for example, may be used to acquire image data from the image capture device 110 via communication interface 126 (e.g., via a Camera Serial Interface (CSI), Ethernet or Wi-Fi interface, or other communication interface). The image data may contain a set of pixels that form an image (e.g., capturing a physical scene illuminated by one or more illuminants) along with metadata information regarding the image. The image capture logic 131 may be used to parse the image data and store the image and metadata information (e.g., as an image data file 102 in memory 124).

The image may have a size (e.g., reflecting a resolution of the image) that may be measured in terms of a quantity of pixels. The image data, for example, may contain an image having a resolution expressed in terms of a width and height of pixels, for example, 720×480 (e.g., Standard-Definition (SD)), 1920×1800 (e.g., High Definition (HD)), 3840×2160 (e.g., 4K Ultra High Definition (4K UHD)), 7680×4320 (e.g., 8K Ultra High Definition (8K UHD)). The image may also conform to a particular format, which may define the information conveyed for each pixel, including for example, the number and type of values (e.g., RGB or YUV) and corresponding value size (e.g., 8-bit, 10-bit, etc.) indicating the range that a value can take (e.g., 0-255, 0-1023, etc.). The image, for example, may be an RGB24 image (or RGB 8:8:8 image), where each pixel has an associated red (r), green (g), and blue (b) value, each represented by 8-bits of data. As another example, the image may be in a "RAW" format (e.g., RAW8, RAW16, etc.) where each image pixel contains the output of a corresponding sensor pixel represented by a particular number of bits (e.g., 8-bit, 16-bit, etc.). In the latter case, the metadata information may indicate the color filter array (CFA) (e.g., a Bayer filter, CYGM filter, etc.) that was used to capture the image, which can be used to determine the color conveyed by a specific pixel. With this information, the image capture logic 131 may reconstruct a full-color image using a demosaicing algorithm. The metadata information, more generally, may provide details regarding the image (e.g., resolution, color space, etc.), image capture device 110 and its settings (e.g., make and model, orientation, aperture, shutter speed, focal length, metering mode, and/or ISO speed), and/or other relevant information (e.g., date, time, and/or location of capture).

In some embodiments, the image capture logic 131 may be used to obtain calibration data from the image capture device 110 (e.g., via a Camera Serial Interface (CSI), Ethernet or Wi-Fi interface, or other suitable communication interface) that reflects the response characteristics of the image sensor 115. The calibration data, for example, may include a set of color calibration points that reflect the sensor response to a reference object of known color when illuminated by a set of known illuminants with varying color temperatures. For example, as discussed above, the color calibration points may be a set of RGB values for a neutral gray object illuminated by different light sources as measured by the image sensor 115. The calibration data may also include a brightness calibration factor that may characterize the relationship between a brightness response of the image sensor 115 and a device independent measure of illuminance, such as lux. The image capture logic 131 may be used to parse and store the calibration data (e.g., as a calibration data file 105 in memory 124).

In some embodiments, the calibration data may include the sensor response captured by an image sensor (e.g., image sensor 115) during a calibration process, which the computing device 120 may process (e.g., using processing logic 132) to determine a set of color calibration points and/or a brightness calibration factor. As discussed above, for example, color calibration may be performed by capturing images of a gray card (e.g., a neutral gray card having a flat reflectance spectrum) using different forms of artificial lighting (e.g., incandescent, fluorescent, or LED lighting) with varying color temperatures. The images may be captured by image capture device 110 and sent to computing device 120 (e.g., via communication interface 126), which may process the images to produce a set of color calibration points (e.g., one or more RGB triplets) reflecting the image sensor response for a neutral gray color at particular color temperatures. The color calibration points may be stored (e.g., as a calibration data file 105 in memory 124) for later use (e.g., in performing auto white balancing).

A brightness calibration process, likewise, may be performed by capturing images under a set of known lux values using image capture device 110. The captured images may be sent to computing device 120 (e.g., via communication interface 126), which may process the images to produce a brightness calibration factor. The computing device 120, for example, may compute an average value of a green channel of the image, and determine a relationship between the average green channel values and the corresponding known lux values, which may be conveyed in the image metadata. In some embodiments, the average green channel value may be adjusted based on the exposure settings used to capture the image (e.g., by dividing the average value by an exposure time and gain product), which may be conveyed in the image metadata. The brightness calibration factor may be stored (e.g., as a calibration data file 105 in memory 124) for later use (e.g., in performing auto white balancing).

The image processing logic 132 may be used to process images or other input data (e.g., images captured using capture logic 131). In some embodiments, the processing logic 132 may be used to compute various statistics regarding an image. The processing logic 132, for example, may be used to determine local average and/or clipping information for the image that is being processed, or a particular region of interest (ROI) within the image. In some embodiments, the processing logic 132 may divide the image (or ROI) into one or more windows and determine local average and clipping information for each window. As an illustrative example, the processing logic 132 may divide an image (e.g., an RGB24 or RAW8 image) having a resolution of 1024×768 pixels into 4096 windows, e.g., a 64×64 grid of windows each having a resolution of 16×12 pixels.

The processing logic 132 may determine the local average for a window by computing the average value of the pixels within the window. Where the image contains multiple color channels (e.g., RGB, RGGB, RGBY, CYGM, etc.), the processing logic 132 may calculate average pixel values for each color component in the window. It will be appreciated that the local average information computed for an image may itself be considered an image ("a local average image"), which can be processed further by processing logic 132. For instance, the local average information in the previous example may be treated as an image having a resolution of 64×64 pixels, with each pixel represented as an RGB pixel reflecting the average red, green, and blue values (e.g., [$r_{avg}$, $b_{avg}$, $g_{avg}$]) of a corresponding window (e.g., 1 to 4096) in the original image (or ROI) from which it was derived (e.g., an RGB24 or RAW8 image).

In determining clipping information, the processing logic 132 may apply upper and/or lower pixel-value limits to identify clipped pixels and may determine the total number of clipped pixels within each window. Where the image includes multiple color channels, the processing logic 132 may determine the number of clipped pixels for each color component in each window. The processing logic 132 may flag or otherwise identify the clipped pixels such that they can be excluded from other processing operations, if so desired. In some embodiments, for example, the processing logic 132 may exclude the clipped pixels when determining local average information of the window.

In some embodiments, the processing logic 132 may be used to normalize or scale an image to adjust the pixel values of the image to fall within a desired range. The processing logic 132, for example, may normalize or scale an image to reduce the impact that certain image pixels may have when processing the image (e.g., to reduce the impact of brighter pixels). In some embodiments, the processing logic 132 may normalize an image (e.g., an RGB local average image) by adjusting the pixel values such that the total pixel value is constant (e.g., r+g+b=1) while maintaining a ratio between each color channel of the image (e.g., between r, g, and b). In other embodiments, the processing logic 132 may scale an image (e.g., an RGB local average image) by adjusting the value of pixels meeting certain criteria to fall within a desired range (e.g., 0 to a maximum value), while maintaining a ratio between each color channel of the image (e.g., between r, g, and b). The processing logic 132, for instance, may adjust the value of pixels having a maximum color component value (e.g., a maximum of an r, g, and b value) that exceeds a saturation threshold by setting the maximum color component value to the saturation threshold and adjusting the remaining color component values to maintain a ratio between one or more (e.g., each) colors. As an illustrative example, the processing logic 132 may scale image pixels whose value exceeds a saturation threshold of 1000. A pixel having an r value of 100, b value of 100, and g value of 200 may be unaffected, while a pixel having an r value of 5000, b value of 5000, and g value of 10000 may be adjusted to have an r value of 500, b value of 500, and g value of 1000.

In some embodiments, the processing logic 132 may be used to convert input data (e.g., an image, a pixel, a calibration point, or other vector) from one domain to another (e.g., from one color space to another). The processing logic 132, for example, may be used to convert input data from a three-dimensional (3D) color space (e.g., where an image pixel is represented by the intensity of one or more color components) to a two-dimensional (2D) chromaticity space (e.g., where color is represented without regard to luminous intensity) and vice versa. In some embodiments, for example, the processing logic 132 may convert input data from an RGB color space to a UV chromaticity space and vice versa.

In some embodiments, for instance, the red, green, and blue color component values of an RGB pixel or data point (e.g., an RGB local average image pixel) may be used to determine U and V component values in a UV chromaticity space. In some embodiments, the U and V values may reflect a relative redness and relative blueness of the RGB pixel or data point. In a resultant UV chromaticity space, for example, small U and large V values may correspond to reddish colors, large U and small V values may correspond to blueish colors, small U and V values may correspond to purplish colors, and large U and V values may correspond to greenish colors. In some embodiments, a resultant UV space may be a non-standard UV chromaticity space (e.g., is not a traditional CIE chromaticity space) having the unique property that the Planckian Locus can be reasonably approximated within the space using a straight line or curve. In some embodiments, a resultant UV space may also have the property that color temperature (e.g., in micro reciprocal degree (or mired)) is proportional to U and/or V.

In some embodiments, the processing logic 132 may convert an image between an RGB color space and the UV space (e.g., by converting each pixel of the image from/to the RGB color space to/from the UV space). The processing logic 132, for example, may be used to convert a local average image (e.g., local average information for an RGB or RAW image) to/from the UV space. The processing logic 132, for example, may treat the average pixel values calculated for each window (1 through n) as a vector (e.g., $[r_{avg}, b_{avg}, g_{avg}]$n), which it may convert into the UV space (e.g., $[U_{avg}, V_{avg}]$n).

FIG. 2A illustrates an example plot 200 of the UV space, where the horizontal axis is a U axis (running from 3 to 0) and the vertical axis is a V axis (running from 3 to 0). As illustrated in FIG. 2A, the plot 200 includes a set of converted points of an image. The local average image may have been derived from an original image capturing a physical scene. The original image, for example, may have been captured by a vehicle camera system and may be dominated by a brightly colored vehicle passing, e.g., in region 202, and/or large portions of blue sky, e.g., in region 204.

Returning to FIG. 1, in some embodiments, the processing logic 132 may be used to convert a set of color calibration points into the UV space. For example, as discussed above, the color calibration points may be a set of RGB values reflecting the response of an image sensor (e.g., image sensor 115) to a neutral gray color at different color temperatures. The processing logic 132 may convert the color calibration points into the UV space, where they may generally fall along a straight line or a curve. In some embodiments, the processing logic 132 may use the resulting set of UV values to define a "gray line" of the image sensor, which may serve as an approximation of the Planckian Locus for the image sensor 115. The processing logic 132, for example, may perform a regression analysis (or similar analysis) on the set of converted UV values to determine a linear or vector expression for the gray line. The gray line can then be used to assist with processing images captured by the image sensor 115 (e.g., when performing white balancing). In some embodiments, processing logic 132 may use the resulting set of UV values to determine a color temperature line of the image sensor. The processing logic 132, for example, may perform a regression analysis (or similar analysis) on the set of converted UV values to determine a linear or vector relationship between color temperature (e.g., in Mired) and U and/or V.

Figure 2B:
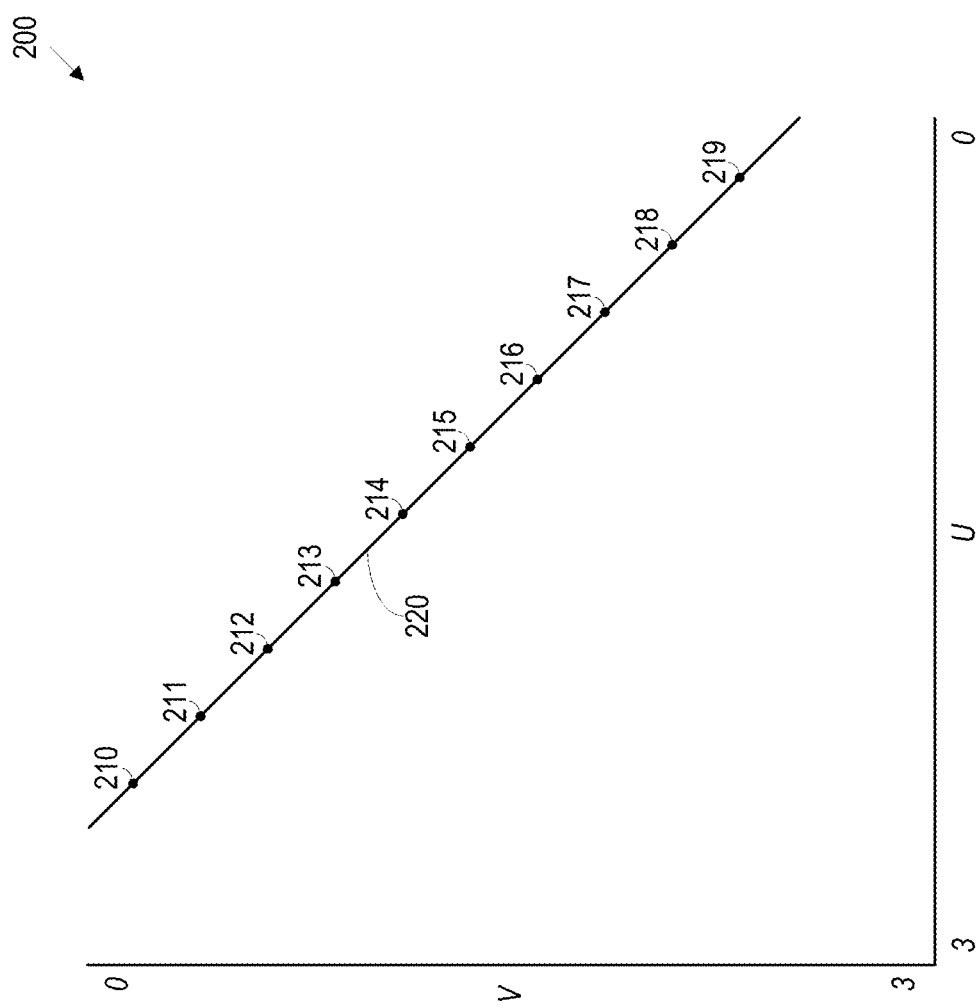
FIG. 2B illustrates an example plot of a chromaticity space including a set of converted color calibration points in accordance with some embodiments of the present disclosure.

FIG. 2B illustrates the example plot 200 as in FIG. 2A but with a set of converted color calibration points 210-219 for image sensor 115, which for example, may correspond to the following color temperatures (in Kelvin): 20000, 10000, 6666, 5000, 4000, 3333, 2857, 2500, 2222, and 2000. A gray line 220 is also included in the plot 200, which may have been determined from the converted color calibration points 210-219 (e.g., by performing a linear regression analysis).

Returning to FIG. 1, in some embodiments, the processing logic 132 may be used to estimate an illuminant color of an image. An illuminant color, for instance, may be estimated by computing an average color of an image or a portion thereof. In some embodiments, for example, the average color may be determined by computing the average pixel value for the image (or portion thereof). Where the image contains multiple color channels (e.g., RGB, RGGB, RGBY, CYGM, etc.), the processing logic 132 may calculate average pixel values for each color component (e.g., an average r, average g, and average b value for an RGB image). The processing logic 132 may compute the average value as an arithmetic mean, a geometric mean, a median, and/or the like. In some embodiments, the average color of an image may be determined using a local average image (e.g., by computing the average pixel value of the local average image (or portion thereof)).

The processing logic 132 may estimate the illuminant color in one or more different domains, for example, different color or chromaticity spaces (e.g., an RGB color space, the UV Space, etc.). In some embodiments, for example, the processing logic 132 may estimate the illuminant color by computing the average color of an image in an RGB color space and converting the average RGB pixel value into a chromaticity space (e.g., a UV space). In other embodiments, the processing logic 132 may estimate the illuminant color by converting the image into a chromaticity space (e.g., a UV space) and then computing the average color of the image in the chromaticity space.

In some embodiments, the processing logic 132 may estimate the illuminant color as an illuminant white point, illuminant gray point, or the like (e.g., the color of a white object or gray object under an illuminant). In some embodiments, for example, the processing logic 132 may estimate an illuminant gray point by calculating an average color of an image, as described, and projecting it onto an approximation of the Planckian Locus (e.g., a gray line of an image sensor 115).

The processing logic 132 may be used to estimate one or more illuminant colors for an image. In some embodiments, for example, the processing logic 132 may assume that a scene is dominated by a single light source, or treat multiple light sources as a single illuminant, and may estimate a single illuminant color for the image. In some embodiments, the processing logic 132 may estimate multiple illuminant colors for an image. An image, for example, may capture a scene containing multiple light sources (e.g., interior lighting within a house, exterior lighting through street lamps, etc.), with no single light source dominating the image. The pixels within each region may have a different color cast on account of the different lighting conditions. In such cases, the processing logic 132 may determine the different lighting conditions present in a scene and segment the image into regions accordingly. The processing logic 132, for example, may generate a pixel mask identifying and grouping pixels into different regions.

In some embodiments, the processing logic 132 may be used to define and apply a weighting function that specifies rules for modifying an image, e.g., to adjust the values of image pixels. The weighting function may be defined in different domains including a color or chromaticity space (e.g., an RGB color space, the UV space, etc.). In some embodiments, the weighting factor to be applied to an image may be determined using a weighting function in one domain, e.g., a chromaticity space, but applied to the image in another domain, e.g., in a color space. In some embodiments, where a weighting factor is defined with respect to a local average image, the weighting factor may be applied to corresponding pixels in an original from which the local average image was derived (e.g., pixels in a corresponding window).

In some embodiments, the weighting function may be used to exclude or minimize the impact of the large colored regions or objects within an image when estimating an illuminant color of an image (e.g., in computing a (weighted) average of its pixel values). The weighting function, for example, may specify a weighting factor to exclude or minimize the impact of portions of the image that fall outside of a region surrounding the Planckian Locus. The weighting function, for instance, may define a distribution of weighting factors about a gray line (e.g., of an image sensor 115).

In some embodiments, for example, the weighting function may be defined in a chromaticity space (e.g., the UV space) and may be parameterized in terms of a color temperature (e.g., along a gray line defined in the UV space) and tint (e.g., orthogonal to the gray line defined in the UV space). By way of example, a color temperature weighting function may define an asymmetric weighting distribution for a weighting factor, α, as follows:

$$\alpha(C) = \begin{cases} 0, & C \le O_{C2} \\ \dfrac{C - O_{C2}}{I_{C2} - O_{C2}}, & O_{C2} < C < I_{C2} \\ 1, & I_{C2} \le C \le I_{C1} \\ 1 + \dfrac{C - I_{C1}}{I_{C1} - O_{C1}}, & I_{C1} < C < O_{C1} \\ 0, & C \ge O_{C1} \end{cases} \quad (1)$$

where C is color temperature in mired, $O_{C2}$ and $O_{C1}$ are outer color temperature limits (e.g., outside of which α is zero and pixels or points are given no weight), and $I_{C2}$ and $I_{C1}$ are inner color temperature limits (e.g., inside of which α is one and pixels or points are given full weight). As defined in Equation 1, the weighting factor α ramps up linearly from zero to one in the $O_{C2}<C<I_{C2}$ region and ramps down linearly from one to zero in the $I_{C1}<C<O_{C1}$ region. In some embodiments, the temperature weighting function may proscribe a minimum weight other than zero, such that pixels or points outside the outer color temperature limits are given the minimum weight and the weighting function ramps up linearly from the minimum weight to one in the $O_{C2}<C<I_{C2}$ region and ramps down linearly from one to the minimum weight in the $I_{C1}<C<O_{C1}$ region.

Similarly, a tint weighting function may define an asymmetric weighting distribution for a weighting factor, β, as follows:

$$\beta(T) = \begin{cases} 0, & T \le O_{T2} \\ \dfrac{T - O_{T2}}{I_{T2} - O_{T2}}, & O_{T2} < T < I_{T2} \\ 1, & I_{T2} \le T \le I_{T1} \\ 1 + \dfrac{T - I_{T1}}{I_{T1} - O_{T1}}, & I_{T1} < T < O_{T1} \\ 0, & T \ge O_{T1} \end{cases} \quad (2)$$

where T is tint, $O_{T2}$ and $O_{T1}$ are outer tint limits (e.g., outside of which β is zero and pixels or points are given no weight), and $I_{T2}$ and $I_{T1}$ are inner tint limits (e.g., inside of which β is one and pixels or points are given full weight). As defined in Equation 2, the weighting factor β ramps up linearly from zero to one in the $O_{T2}<T<I_{T2}$ region and ramps down linearly from one to zero in the $I_{T1}<T<O_{T1}$ region. In some embodiments, the tint weighting function may proscribe a minimum weight other than zero, such that pixels or points outside the outer tint limits are given the minimum weight and the weighting function ramps up linearly from the minimum weight to one in the $O_{T2}<T<I_{T2}$ region and ramps down linearly from one to the minimum weight in the $I_{T1}<T<O_{T1}$ region.

Figure 2C:
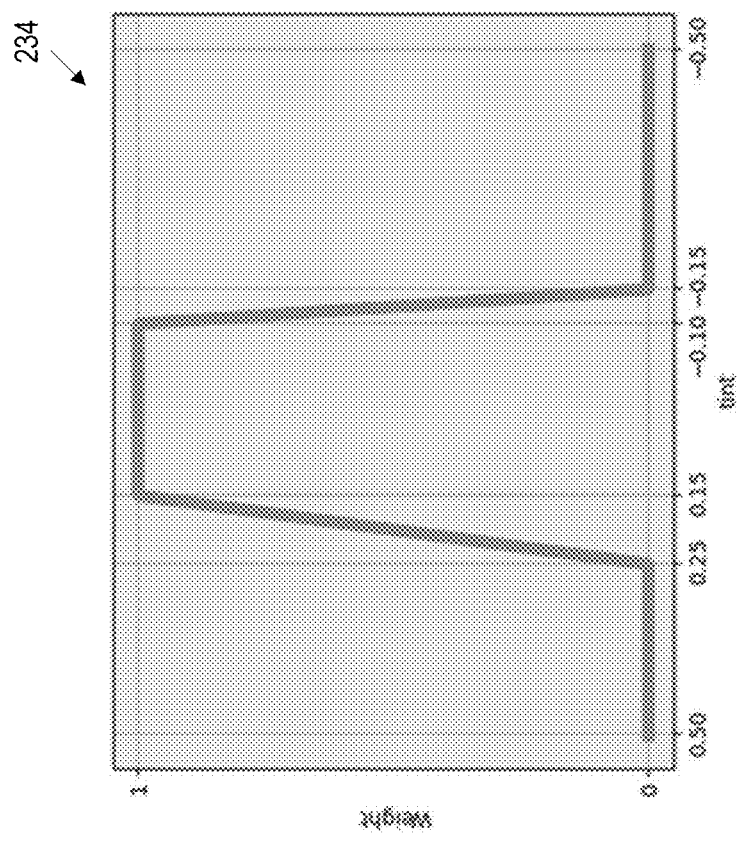
FIG. 2C illustrates example plots of color temperature and tint weighting distributions in accordance with some embodiments of the present disclosure.
Figure 2C:
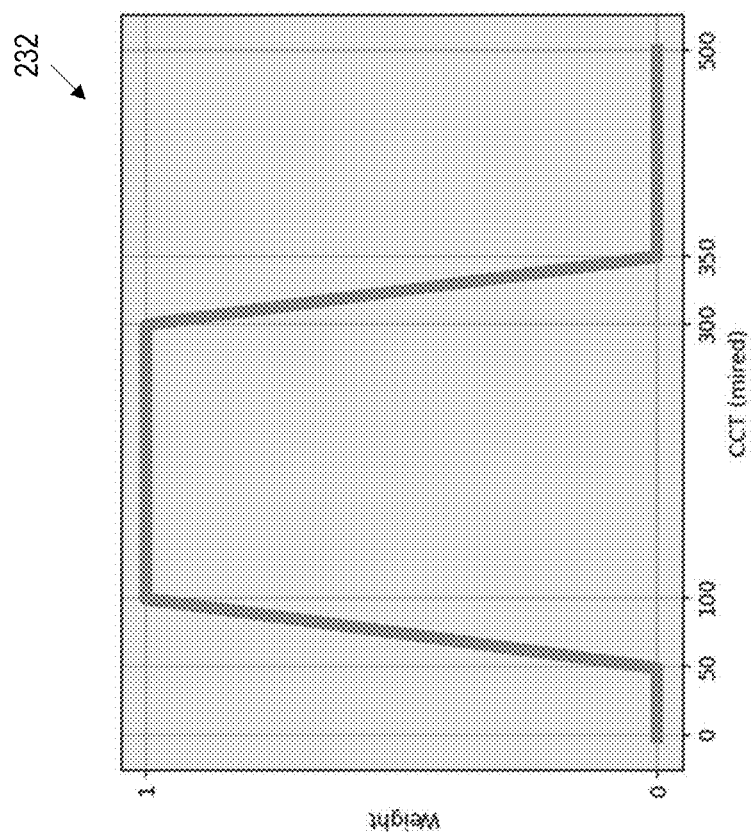

FIG. 2C illustrates a pair of color temperature and tint weighting distribution plots. In the color temperature plot 232, the horizontal axis represents a color temperature (C) in mired and the vertical axis represents a weighting factor α (from zero to one). The color temperature plot 232 depicts the weighting function of Equation 1 with the following color temperature limits: [350, 300, 100, 50]. In the tint plot 234, the horizontal axis represents a tint (T) distance (e.g., a distance from a gray line in the UV Space) and the vertical axis represents a weighting factor β (from zero to one). The tint plot 234 depicts the weighting function of Equation 2 with the following tint limits: [−0.15, −0.1, 0.15, 0.25].

A combined weighting function may define a weighting distribution as follows:

$$\gamma(C,T) = \alpha(C)*\beta(T) \quad (3)$$

with the combined weighting function being defined with reference to a set of color temperature limits (e.g., [$O_{C1}$, $I_{C2}$, $I_{C2}$, $O_{C2}$]) and tint limits (e.g., [$O_{T1}$, $I_{T1}$, $I_{T2}$, $O_{T2}$]). As an illustrative example, a combined weighting function may be defined using the following color temperature limits: [350, 300, 100, 50] and the following tint limits: [−0.15, −0.1, 0.15, 0.25]. In some embodiments, the color temperature limits may be specified in Kelvin (e.g., as [2857, 3333, 10000, 20000]), which may be converted to mired units using the following equation:

$$M = \frac{1,000,000}{K} \quad (4)$$

Figure 2D:
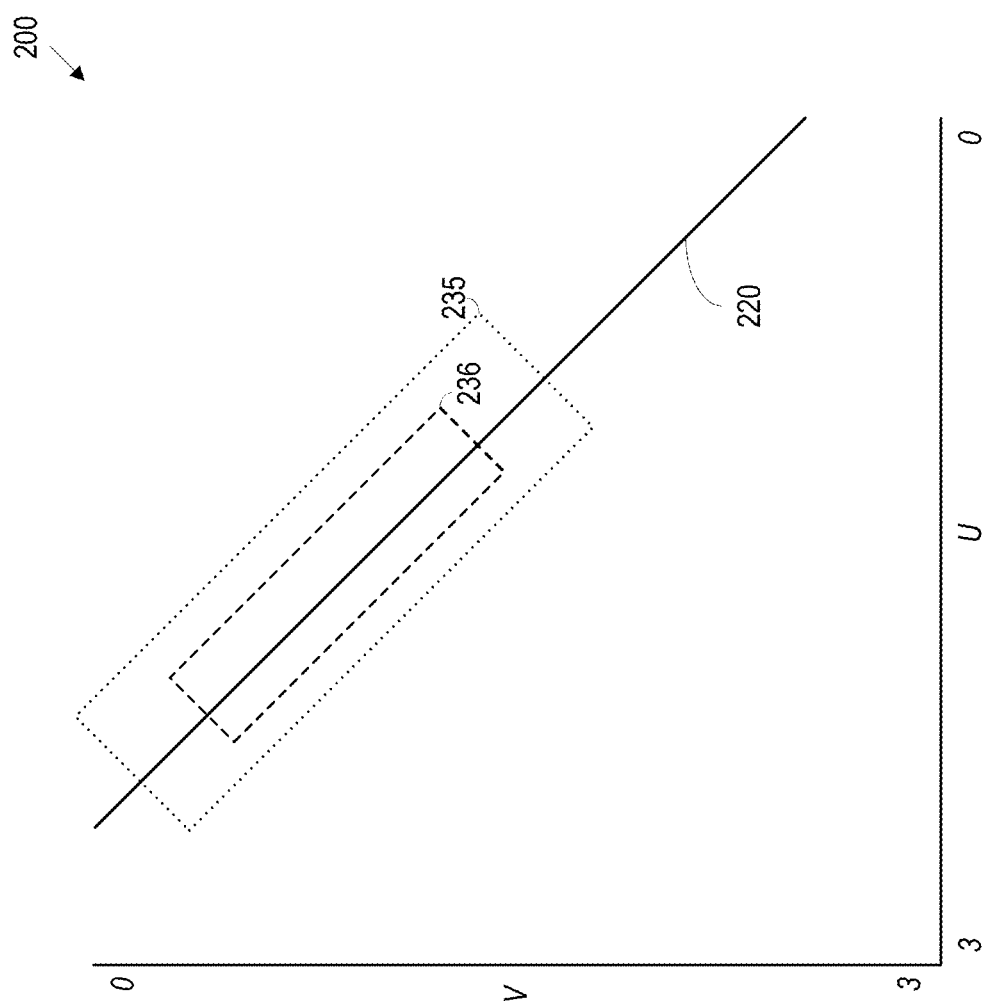
FIG. 2D illustrates an example plot of a chromaticity space including the boundary outlines of a combined weighting function in accordance with some embodiments of the present disclosure.

FIG. 2D illustrates the example plot 200 as in FIGS. 2A-2B but outlining the boundaries of the combined weighting distribution of Equation 3 discussed above, e.g., with the following color temperature limits (in Kelvin): [2857, 3333, 10000, 20000] and the following tint limits: [−0.15, −0.1, 0.15, 0.25]. The outer temperature and tint limits, for instance, may be seen as setting an outer boundary 235, outside of which the weighting factor may be zero, and the inner temperature and tint limits may be seen as setting an inner boundary 236, inside of which the weighting factor may be one. In the region between the inner and outer boundaries, the weighting factor may transition from zero to one, as discussed herein.

Returning to FIG. 1, the processing logic 132 may use the weighting function to determine a set of weighting factors to apply to an image, which may take the form of a weighting factor matrix (or weighting factor image), having the same dimensions as the resolution of the image provided to the weighting function. By way of example, a local average image may be in an RGB color space (e.g., where it is derived from an RGB24 or RAW8 image), which processing logic 132 may convert into the UV Space. The processing logic 132 may then use the weighting function of Equations 1-3 to determine a weighting factor for each pixel in the converted local average image. In applying the weighting function of Equations 1-3 to the converted local average image, the processing logic 132 may determine a color temperature and tint of each pixel by orthogonally projecting the pixel onto a gray line in the UV space and determining a minimum distance from the gray line, respectively. The processing logic 132 may then determine a corresponding weighting factor for each pixel.

The processing logic 132 may be used to apply a set of weighting factors (e.g., a weighting factor matrix) to an image. The processing logic 132, for example, may multiply each pixel of an image by a corresponding weighting factor in the weighting factor matrix to produce a weighted image pixel. As noted above, in some embodiments, the weighting factors may be determined using a weighting function in one domain but applied to the image in another domain. The processing logic 132, for example, may use the weighting factor matrix generated from the local average image in the UV space to adjust the values of the local average image in the RGB color space.

In some embodiments, the processing logic 132 may apply a set of weighting factors as part of another operation. The processing logic 132, for example, may use the weighting factors to compute a weighted average image color. In some embodiments, the processing logic 132 may be used to compute a weighted average image color of an image using a set of weighting factors.

The processing logic 132, for example, may multiply each pixel of an image (e.g., an RGB image) by a corresponding weighting factor in the weighting factor matrix to produce a weighted image pixel (e.g., [γ*r, γ*b, γ*g]) and compute a total value for the image (e.g., [Σγ*r, Σγ*b, Σγ*g]). The processing logic 132 may divide the resulting values by the sum of the weighting factors (e.g., [Σγ] that were applied to obtain a weighted average image color (e.g., [wr$_{avg}$, wg$_{avg}$, wb$_{avg}$]). For clarity, the weighted average image color of an RGB image may be calculated as follows:

$$wr_{avg} = \frac{\sum \gamma * r}{\sum \gamma}, wg_{avg} = \frac{\sum \gamma * g}{\sum \gamma}, wb_{avg} = \frac{\sum \gamma * b}{\sum \gamma} \quad (7)$$

FIG. 2E illustrates the example plot 200 as in FIGS. 2A-2C with the boundaries of the combined weighting function of Equation 3 (illustrated in and described above with reference to FIG. 2C) overlayed on top of the converted local average image pixels (illustrated in and described above with reference to FIG. 2A). As illustrated, the weighting function of Equation 3 when applied to the local average image may operate to exclude certain non-neutral portions of the image. The weighting function, for example, may produce weighting factors that operate to exclude region 202, which may correspond to a portion of the image containing a brightly colored vehicle, and may reduce the weight given to region 204, which may correspond to large portions of blue sky.

Figure 2F:
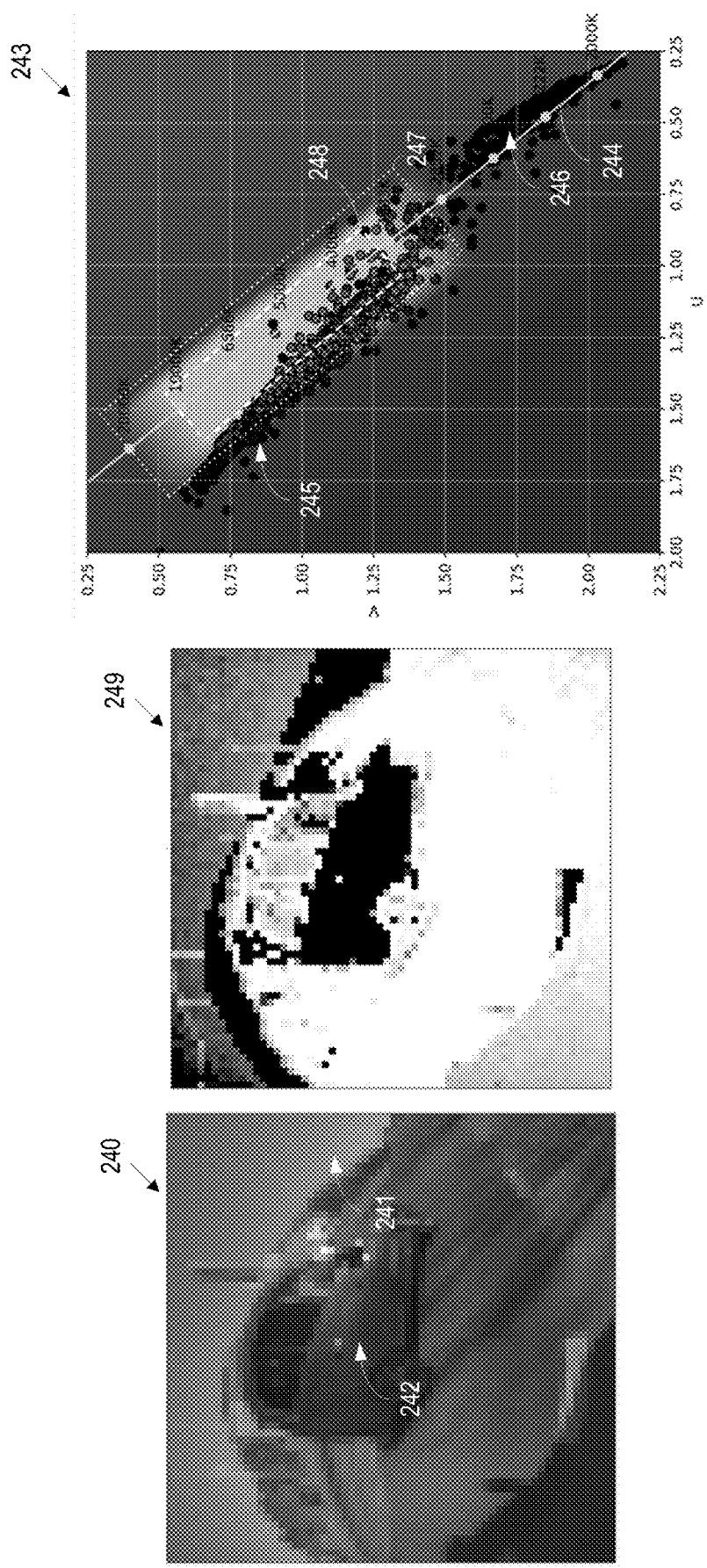
FIG. 2F illustrates an example of an application of a weighting function to an image having large colored regions and objects in accordance with some embodiments of the present disclosure.
Figure 2G:
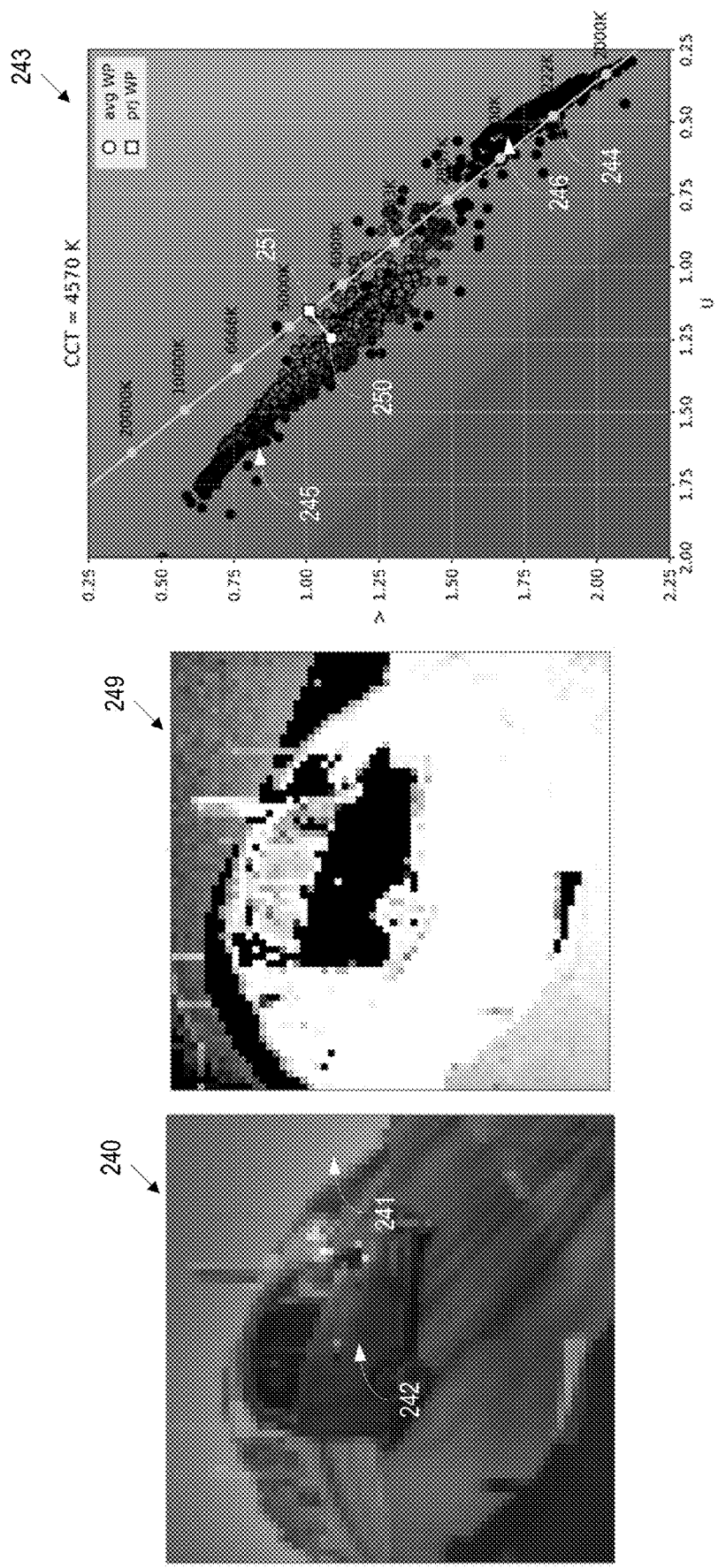
FIG. 2G illustrates an example of an application of a weighting function in computing a weighted average color of an image having a large colored object in accordance with some embodiments of the present disclosure.
Figure 2H:
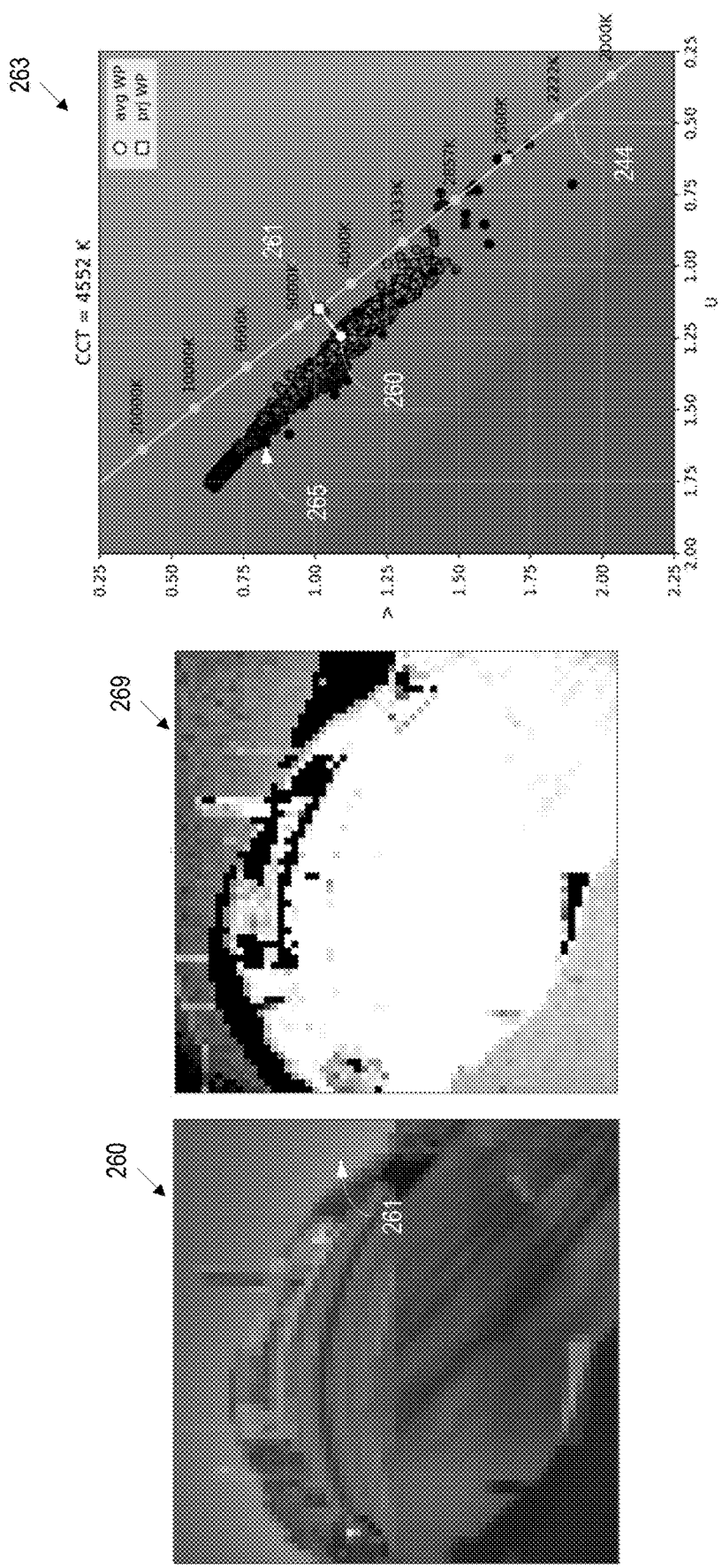
FIG. 2H illustrates an example of an application of a weighting function in computing a weighted average color of an image similar to that of FIG. 2G but without the large colored object in accordance with some embodiments of the present disclosure.

FIGS. 2F-H provide an illustrative example of the application of a weighting function in computing an average image color. FIG. 2F includes three plots, a local average image plot 240, a chromaticity plot 243, and a weighting factor image plot 249. The local average image plot 240 shows a local average image that may have been derived from an original image captured by a vehicle camera system. The original image may have captured a scene that includes large portions of blue sky and a brightly colored vehicle, which can may be seen in regions 241 and 242 of the local average image plot 240, respectively.

The chromaticity plot 243 is a plot of a portion of a UV space (e.g., similar to those of FIGS. 2A-2B and 2C-2D) where the horizontal axis is a U axis (running from 2 to 0.25) and the vertical axis is a V axis (running from 2.25 to 0.25). As illustrated, the chromaticity plot 243 includes a set of converted points of the local average image in local average image plot 240 along with a gray line 244. The brightly colored vehicle in the local average image plot 240 may appear in region 246 of the chromaticity plot 243 and the portions of blue sky in the local average image may appear in region 245. The chromaticity plot 243 also includes the boundaries of a combined weighting function using Equation 3, e.g., with outer and inner temperature and tint limits. The outer temperature and tint limits, for instance, may be seen as setting an outer boundary 247, outside of which the weighting factor may be zero, and the inner temperature and tint limits may be seen as setting an inner boundary 248, inside of which the weighting factor may be one. In the region between the inner and outer boundaries, the weighting factor may transition from zero to one.

The weighting factor image plot 249 is a grayscale colormap of a weighting factor image that may result from the application of the weighting function to the local average image. That is, each pixel in the weighting factor image plot 249 represents the weighting factor for a corresponding pixel of the local average image plotted in local average image plot 240. The weighting factors, which may range from zero to one, may be represented by an equivalent gray value (e.g., with zero corresponding to black and one corresponding to white). As can be seen, the weighting function may produce weighting factors that operate to exclude and/or reduce the weight given to local average image pixels in region 242 (or region 246), corresponding to portions of the brightly colored vehicle, and pixels in region 241 (or region 245), corresponding to portions of the sky.

FIG. 2G includes the same three plots as in FIG. 2F, but with the chromaticity plot 243 no longer including the weighting function boundaries. Instead, the chromaticity plot 243 identifies the weighted average image color of the local average image in the UV space, as point 250, along with an estimated illuminant gray point, as point 251, which may be the orthogonal projection of point 250 onto gray line 244. As illustrated, the estimated illuminant gray point (e.g., point 251) has a color temperature of 4570 K.

FIG. 2H, like FIG. 2F, includes a local average image plot 260, a chromaticity plot 263, and a weighting factor image plot 269. The local average image shown in local average image plot 260 is derived from an original image capturing a similar scene to that of FIG. 2F (e.g., shown in local average image plot 240), which includes portions of blue sky, e.g., in region 261, but does not include a brightly colored vehicle (e.g., shown in region 242 of local average image plot 240). The chromaticity plot 243 includes a set of converted points of the local average image in local average image plot 260 along with gray line 244. As in FIGS. 2F and 2G, the portions of blue sky in the local average image (e.g., shown in local average image plot 260) may appear in the chromaticity plot 263, in region 265.

The weighting factor image plot 269 is a grayscale colormap of a weighting factor image that may result from the application of the weighting function—e.g., the same weighting function as in FIGS. 2F and 2G—to the local average image shown in local average image plot 260. As can be seen, the weighting function may produce weighting factors that operate to exclude and/or reduce the weight given to local average image pixels in region 241 (or region 245), corresponding to portions of the sky.

The chromaticity plot 243 also identifies the weighted average image color of the local average image in the UV space, as point 260, along with an estimated illuminant gray point, as point 261, which may be the orthogonal projection of point 260 onto gray line 244. As illustrated, the estimated illuminant gray point (e.g., point 251) has a color temperature of 4552 K, which is roughly the same as the estimated illuminant gray point of FIG. 2G. The weighting function, thus, operated to exclude and/or minimize the impact of the brightly colored vehicle in the local average image of FIG. 2G when estimating the illuminant gray point of the local average image.

Returning to FIG. 1, in some embodiments, the weighting function may be tuned for particular lighting conditions (e.g., a naturally lit daytime scene, a scene in which the objects are shaded, a nighttime scene, an indoor scene lit by an incandescent light source, etc.). The weighting function, for example, may be parametrized based on a scene brightness, which tends to be directly associated with an illuminant color temperature. The weighting function, for instance, may define a set of weighting distributions (e.g., a set of n weighting distributions: γ(C,T)$_1$, γ(C,T)$_2$, . . .

γ(C,T)$_n$), with each weighting distribution being defined for a particular scene brightness or a range of scene brightnesses (e.g., associated with particular lighting conditions). A scene brightness of the image (or estimation thereof) may then be used to select a weighting distribution from amongst the set to be applied to the image or other input data.

Where the scene brightness of an image does not match a scene brightness (or range of scene brightnesses) of a defined weighting distribution, a nearest weighting distribution (e.g., with respect to scene brightness) may be selected. Alternatively, a weighting distribution may be determined based on two adjacent weighting distributions (e.g., through linear interpolation). In some embodiments, for example, where the weighting distributions are defined using certain constant parameters or limits (e.g., color temperature and/or tint limits), the parameters may be interpolated to define a new weighting distribution to be applied to the image.

Figure 2I:
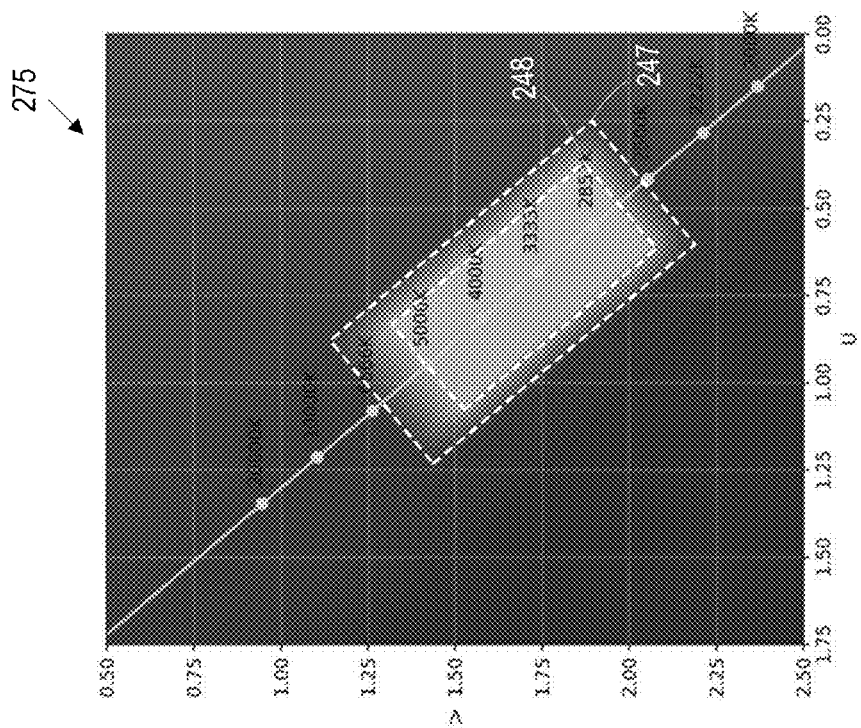
FIG. 2I illustrates an example plot of a chromaticity space including the boundary outlines of a weighting function in accordance with some embodiments of the present disclosure.
Figure 2I:
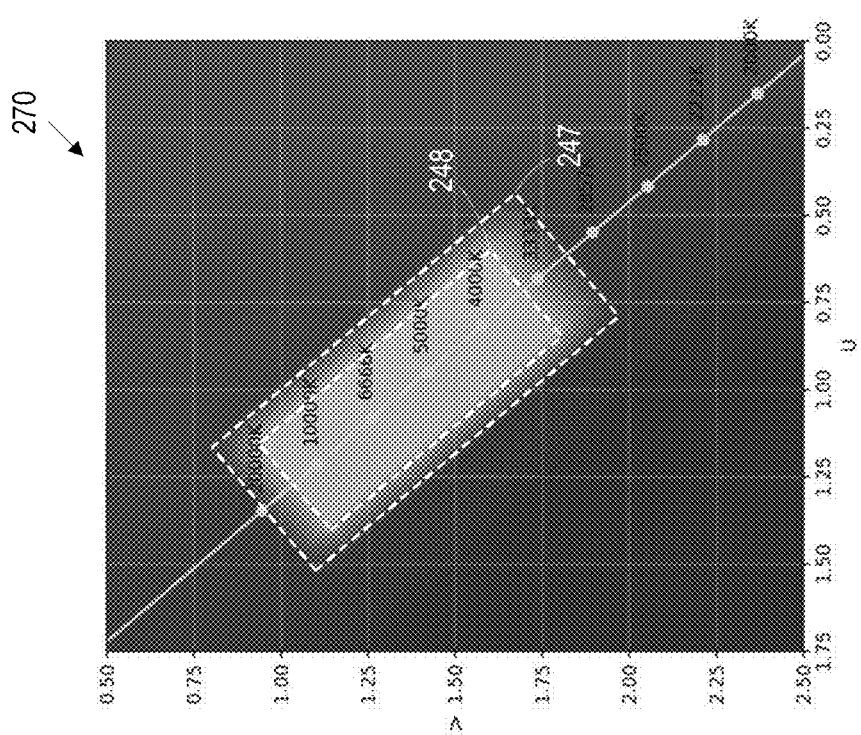

With reference to Equations 1-3, for instance, a weighting distribution may be defined with reference to a set of color temperature limits (e.g., [$O_{C2}$, $I_{C2}$, $I_{C2}$, $O_{C1}$]) and tint limits (e.g., [$O_{T2}$, $I_{T2}$, $I_{T1}$, $O_{T1}$]). The color temperature and tint limits for two weighting distributions can then be interpolated to obtain a new set of color temperature and tint limits defining a new weighting distribution. As an illustrative example, the color temperature limits in Kelvin of a weighting distribution defined for a brightness of 1000 lux may be: [2500, 2700, 5000, 6500], and the color temperature limits in Kelvin of a weighting distribution defined for a brightness of 10000 lux may be: [3000, 3500, 12500, 20000]. FIG. 2I illustrates chromaticity plots 270 and 275 outlining the boundaries of the combined weighting distribution of Equation 3 with the aforementioned color temperature limits (e.g., for a brightness of 10,000 lux and 1,000 lux). The weighting distribution defined for 10,000 lux may be biased toward higher color temperatures (e.g., as can be seen in chromaticity plot 270), whereas the weighting distribution for 1,000 lux may be biased toward lower color temperatures (e.g., as can be seen in chromaticity plot 275). For a given scene brightness of 5500 lux, a new weighting distribution may be defined by interpolating between the two sets of color temperature limits, resulting in the following set of color temperature limits: [2750, 3100, 8750, 13250].

In some embodiments, the processing logic 132 may be used to estimate a scene brightness of an image. The estimated scene brightness may be used by the processing logic 132 to determine a weighting function to apply to an image (e.g., to select a weighting distribution, as discussed above). In some embodiments, for example, the processing logic 132 may estimate a scene brightness of the image by computing an average luminance of the image.

In some embodiments, the luminance may be determined based on a particular color component of the image (e.g., green channel in an RGB image, or white channel in an RGBY image). The processing logic 132, for instance, may estimate a scene brightness as an average of the green channel of an image (e.g., the of green values of pixels in an RGB or RAW image). In other embodiments, the luminance may be determined based on a weighted average image color. In some embodiments, the processing logic 132 may process the image to reduce the impact of bright pixels (e.g., having large green values)—which can otherwise skew results—to provide a perceptually better brightness estimate. That is, intensity contrast for human perception is non-linear (e.g., human beings are relatively less sensitive to intensity changes in higher brightnesses than in lower brightnesses) and may be better reflected in a log domain.

In some embodiments, for example, the processing logic 132 may filter a green channel of an image to remove the top and bottom n percent of values (e.g., the top and bottom 5%). The processing logic 132 may then take the log of the remaining green values, compute an average of the log results, and then raise the resulting average value to the power of the log base to obtain a linearized brightness value. In some embodiments, processing logic 132 may utilize an intensity histogram to obtain the linearized brightness value, which may help reduce computational complexity (e.g., reducing the number of computations to the number of histogram bins. Processing logic 132, for instance, may generate an intensity histogram (e.g., having n bins), take the log of the intensity histogram (e.g., compute a log of each of the n bins), compute an average of the log results (e.g., across the n bins), and then raise the resulting average value to the power of the log base to obtain a linearized brightness value. The processing logic 132 may adjust the linearized brightness value based on an exposure of the image sensor 115 in capturing the image (e.g., by dividing the value by an exposure time and gain product). The processing logic 132 may then apply a brightness calibration factor to convert the adjusted linearized brightness value to a lux value to obtain the estimated scene brightness.

In some embodiments, the processing logic 132 may be used to apply a set of one or more correction factors to an image to color correct the image. The processing logic 132, for example, may apply a set of corrective gains to each color channel of an image to white balance an image. The processing logic 132, for instance, may white balance an RGB image by applying an r'gain, $g_{gain}$ and $b_{gain}$ to each pixel of the image, e.g., by multiplying the pixel r values by r'gain, g values by $g_{gain}$, and b values by $b_{gain}$. In some embodiments, the processing logic 132 may only apply an r'gain and $b_{gain}$ (e.g., treating the $g_{gain}$ as one) to white balance the RGB image.

In some embodiments, the processing logic 132 may be used to determine the correction factors used in performing color correction on the image. The processing logic 132, for example, may determine the corrective gains used for white balancing an image based on an estimated illuminant color. A neutral pixel, for instance, should have equal red, green, and blue values (e.g., r=g=b). Accordingly, in some embodiments, the processing logic 132 may use an estimated illuminant color to determine an $r_{gain}$ and $b_{gain}$ that when applied to the image will result in pixels of neutral objects having red and blue values equal to their green value. In embodiments where the estimated illuminant color is determined in the UV space, the processing logic 132 may convert the illuminant color back to the RGB color space to determine the white balance correction factors to be applied.

In some embodiments, the processing logic 132 may be used to determine a confidence level in the illuminant color estimation and/or corrective gains produced by a white balance technique. The manner in which the confidence level is determined may depend on the white balance technique that is employed and may seek to assess a reliability of the technique (e.g., based on the image statistics on which it relies). In some embodiments, for example, where the white balancing technique involves the application of a weighting function (e.g., to adjust pixel values when estimating an average image color), the processing logic 132 may determine a level of confidence based on an assessment of whether a sufficient number or amount of pixels remained after applying the weighting function. For instance, if most pixels in an image were given full weight by the weighting function, the level of confidence in the white balance technique (and the illuminant color estimation it produced) may be high. Whereas if too many pixels were excluded or given little weight by the weighting function, the level of confidence in the white balance technique (and the illuminant color estimation it produced) may be low.

In some embodiments, for instance, the processing logic 132 may determine the confidence level as the average weighting applied to the image. The processing logic 132, for example, may compute the ratio between a sum of the weighting factors applied to an image (e.g., to each pixel of the image) and the total number of pixels in the image available for weighting (e.g., that were not clipped or otherwise excluded). In embodiments where the weighting function was applied to a local average image, the processing logic 132 may modulate the weighting factors applied to the local average image by the number of available pixels (e.g., that were not clipped or otherwise excluded) in a corresponding window of the original image (e.g., from which the local average image was derived). That is, the processing logic 132 may compute a ratio between the sum of the weighting factors applied to a local average image multiplied by the number of available pixels in a corresponding window of an original image, and the total number of pixels in the original image available for weighting. In embodiments where the local average image contains average values for multiple color components, the processing logic 132 may compute a ratio for each color component— e.g., modulating the weighting factors by the number of available pixels for each color component and dividing by the total number of available pixels for the color component—and identify the minimum ratio as the confidence level for the white balancing technique.

In some embodiments, where the white balancing technique involves normalizing or scaling an image (e.g., to reduce the impact that brighter pixels may have in computing an average image color), the processing logic 132 may determine a level of confidence based on an assessment of the number of pixels that were clipped such that normalizing or scaling the image could not have been reliably performed (e.g., because the ratio between color components is not meaningful). The processing logic 132, for example, may compute a ratio between the number of available pixels (e.g., that were not clipped or excluded) for each color component of the image and the total number of pixels for the color component in the image. The processing logic 132 may identify the minimum ratio as the confidence level for the white balancing technique.

In some embodiments, the processing logic 132 may use the confidence level in a white balance technique to determine whether to rely upon an alternative white balance technique. The processing logic 132, for example, may compare the confidence level to some threshold criteria to determine whether an alternative white balance technique should be applied instead. In other embodiments, the processing logic 132 may employ a soft thresholding method, whereby the illuminant color, or corrective white balance gains, produced by a first white balance technique are blended with those produced by a second technique. The processing logic 132, for example, may use a blending function parameterized by confidence level to determine a blending factor. The processing logic 132, for instance, may use the following equation to determine a blending factor, $\mu$:

$$\mu(L) = \begin{cases} 0, & L \leq Conf_{Low} \\ \dfrac{L - Conf_{Low}}{Conf_{High} - Conf_{Low}}, & Conf_{Low} < L < Conf_{High} \\ 1, & L \geq Conf_{High} \end{cases} \quad (5)$$

where L is a given confidence level, $Conf_{Low}$ is a low-confidence threshold (e.g., below which the results of the technique are rejected as being unreliable), and $Conf_{High}$ is a high-confidence threshold (e.g., above which the results of the technique are accepted as being ideal). As defined, the blending factor $\mu$ ramps up linearly from zero to one when the confidence level is between the low and high confidence threshold. The processing logic 132 may use the blending factor $\mu$ to alpha-blend the results of a first technique (e.g., an illuminant color estimation or corrective white balance gains) with that of a second technique. As an illustrative example, a set of blended white balance gains, $wb_{blend}$ (e.g., $[r_{gain}, b_{gain}]_{blend}$), may be computed from a first set of white balance gains, $wb_1$ (e.g., $[r_{gain}, b_{gain}]_1$), and a second set of white balance gains, $wb_2$ (e.g., $[r_{gain}, b_{gain}]_2$), as follows:

$$wb_{blend} = \mu \cdot (wb_1) + (1-\mu) \cdot (wb_2) \quad (6)$$

Alternatively, in some embodiments, the processing logic 132 may alpha-blend the estimated illuminant color, with the blended illuminant color being used to determine a set of corrective white balance gains as discussed above.

In some embodiments, the processing logic 132 may repeat this soft thresholding process for additional white balance techniques. By way of example, the processing logic 132 may further blend the blended results with the results of a third technique based on a confidence level determined for the second technique. In some embodiments, the processing logic 132 may ultimately fall back to a pseudo-manual white balance technique after which no further blending will be performed. The processing logic 132, for example, may determine a set of corrective white balance gains based on an estimated scene brightness of the image and a set of manually defined corrective white balance gains (e.g., defined for varying brightnesses).

As a non-limiting example, a set of corrective white balance gains may be manually defined as follows:

TABLE 1

| Lighting Conditions | Brightness (in lux) | Red Channel Gain | Blue Channel Gain | Green Channel Gain |
|---|---|---|---|---|
| Dark | 0 | 1.3 | 2.4 | 1 |
| Indoor dim (e.g., incandescent lighting) | 100 | 1.3 | 2.4 | 1 |
| Indoor bright (e.g., fluorescent lighting) | 1,000 | 1.8 | 2 | 1 |
| Outdoor (e.g., 5000K) | 10,000 | 2.2 | 1.8 | 1 |
| Outdoor bright (e.g., 6500K) | 100,000 | 2.3 | 1.5 | 1 |
| Brightest Sunlight | 1,000,000 | 2.3 | 1.5 | 1 |

The processing logic 132 may determine a set of corrective gains to apply to an image by linearly interpolating the corrective gains defined for the two brightness levels adjacent to an estimated scene brightness of an image (e.g., estimated using processing logic 132, as described herein).

In some embodiments, the processing logic 132 may perform a spatially variant white balancing technique. The processing logic 132, for example, may segment an image into different regions, each of which may be affected by different lighting conditions (e.g., illuminated by a different light source). That is, the pixels within each region may have a different color cast on account of different lighting conditions. An image, for example, may capture a scene containing multiple light sources (e.g., interior lighting within a house, exterior lighting through street lamps, etc.), with no single light source dominating the image. In such cases, the processing logic 132 may be used to segment the image into different regions, which may be separately white balanced. The processing logic 132, for example, may estimate an illuminant color for each region. The processing logic 132 may use these illuminant color estimations to determine a set of corrective gains for each region and may apply the corrective gains to each region to white balance the image.

In some embodiments, the processor 122 may include image processing pipeline logic 133 that may be used to implement one or more image processing pipelines to capture and process an image. The image processing pipeline may include a number of processing components that may be connected together to affect processing of a captured image. Each processing component may accept a number of inputs and generate a number of outputs, with the outputs of one component being provided to one or more other components to form the image processing pipeline. The processing components may maintain one or more buffer pools (e.g., in memory 124) to store the outputs generated by the component and may use image buffers and queues to send the outputs to the next component (or components) in the processing pipeline.

The image processing pipeline logic 133, for example, may be used to implement an auto white balancing (AWB) processing pipeline (or AWB pipeline) 140. The AWB pipeline 140, at a high level, may involve the following stages: an image acquisition stage 141, an illuminant color estimation stage 142, a correction factor determination stage 143, and a correction factor application stage 144. At the image acquisition stage 141, an image may be acquired by the computing device 120, e.g., from the image capture device 110. The captured image may be passed along to the illuminant color estimation stage 142 where the computing device 120 may estimate an illuminant color of the captured image. The computing device 120 may use the estimated illuminant color to determine a set of white balance correction factors (e.g., white balance gains) at the correction factor determination stage 143. Finally, at the correction factor application stage 144, the computing device 120 may apply the white balance correction factors to the captured image to white balance the image. Each stage in the AWB pipeline 140 may include a number of processing components that operate together to affect white balancing of an image. Additional detail regarding the processing components, which may employ various aspects of the processing logic 132 described herein, and their operation in performing each stage is provided by way of example in the discussion below.

The AWB pipeline 140 is not intended to represent a complete processing pipeline, and one or more additional or alternative stages or operations may be performed in the AWB pipeline 140 or in addition to the AWB pipeline 140 (e.g., as part of a broader image processing pipeline). Such additional or alternative stages or operations may include, for example, a pixel inversion, a demosaicing, a color correction, a tone mapping, a color saturation adjustment, and/or an auto-exposure stage or operation. As such, the AWB pipeline 140 may include additional and/or alternative stages and/or operations, which may be performed before, between, as part of, and/or after those described herein.

Figure 3:
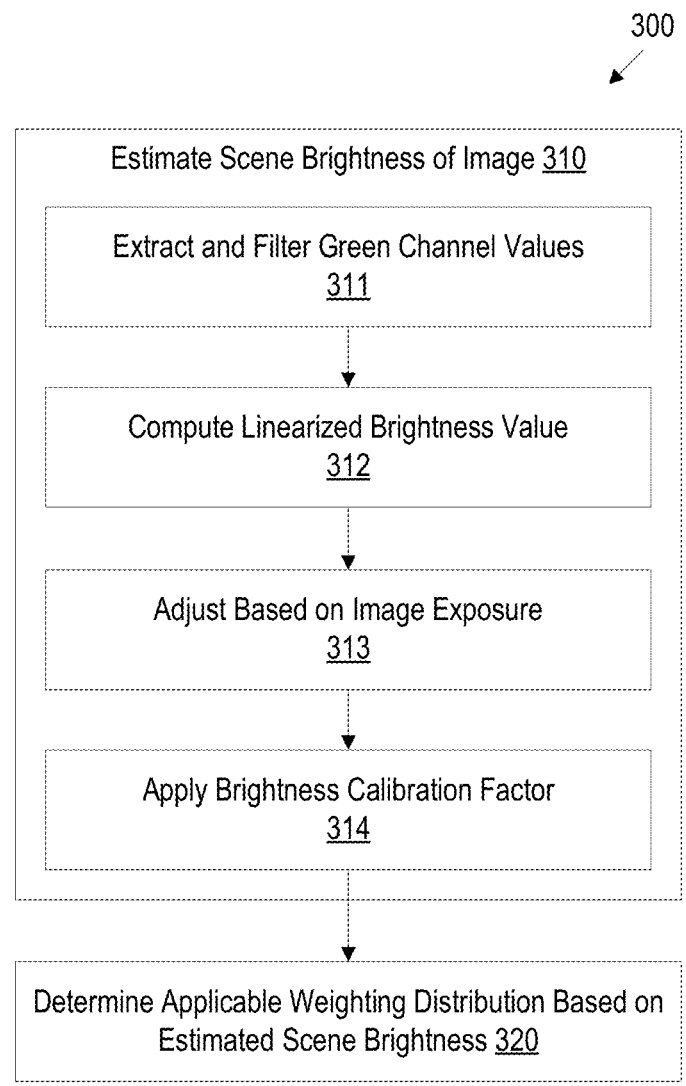
FIG. 3 illustrates a flow diagram of an example method for determining an applicable weighting distribution in accordance with some embodiments of the present disclosure.
Figure 4:
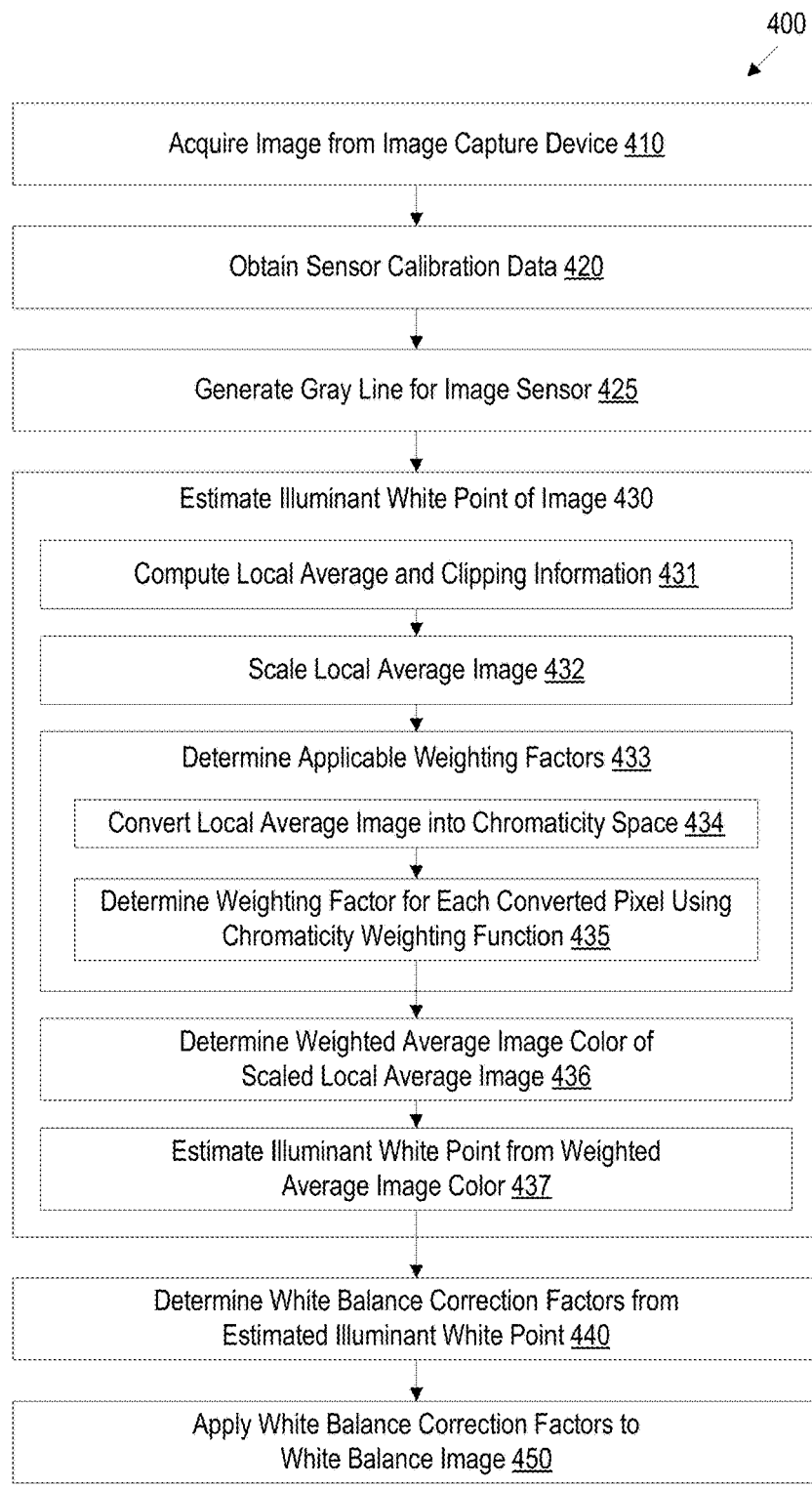
FIG. 4 illustrates a flow diagram of an example method for auto white balancing an image in accordance with some embodiments of the present disclosure.

FIGS. 3-5 illustrate example methods in accordance with embodiments of the present disclosure. For the sake of simplicity and clarity, these methods are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations.

FIG. 3 illustrates a flow diagram of an example method 300 for determining an applicable weighting distribution in accordance with some embodiments of the present disclosure. A weighting function, for example, may define a set of weighting distributions (1 to n), each corresponding to a particular scene brightness or range of scene brightnesses. The individual weighting distributions may be defined with reference to a set of constant parameters or limits. The weighting distributions, for instance, may be defined with reference to a set of color temperature limits (e.g., $[O_{C2}, I_{C2}, I_{C1}, O_{C1}]$) and tint limits (e.g., $[O_{T2}, I_{T2}, I_{T1}, O_{T1}]$) as in Equation 3. The method 300 may determine an applicable weighting distribution from the set of weighting distributions based on a scene brightness of an image. The method 300 may be performed by processing logic of a computing device (e.g., using processor 122 of computing device 120 shown in FIG. 1).

At operation 310, the processing logic may estimate a scene brightness of an image. In some embodiments, for example, the processing logic may look at a color component of the image (e.g., the green channel values of an image) to estimate its brightness. In some embodiments, the processing logic may process the color component values to reduce the impact of bright pixels, which may otherwise skew the brightness estimate.

At block 311, the processing logic may extract the color component values (e.g., green channel values) from an image and filter the extracted values to remove extremely bright and/or extremely dim pixels. The processing logic, for example, may exclude the top and bottom n percent of values (e.g., without limitation, the top and bottom 5% of values).

At block 312, the processing logic may then compute a linearized brightness value. The processing logic, for example, may take the log (e.g., $\log_2$ or $\log_{10}$) of the remaining values (e.g., produced by block 311) and may compute an average of the resulting log values. The processing logic may raise the average log value to the power of the log base to obtain the linearized brightness value.

At block 313, the processing logic may adjust the linearized brightness value (e.g., determined at block 312) based on an exposure of the image. The processing logic, for example, may parse metadata associated with the image to determine the exposure settings of the image capture device (and image sensor) used to capture the image, e.g., an exposure time and exposure gain. The processing logic may divide the linearized brightness value by a product of the exposure time and exposure gain.

At block 314, the processing logic may apply a brightness calibration factor to convert the adjusted linearized brightness value to a lux value. The processing logic, for example, may multiply the adjusted linearized brightness value by the brightness calibration factor to obtain a corresponding lux value. The resulting lux value may serve as the estimated scene brightness of the image and the output of block 314 (and operation 310).

At operation 320, the processing logic may use the estimated scene brightness to determine an applicable weighting distribution. In some embodiments, for example, the processing logic may select a corresponding weighting distribution from amongst a set of weighting distributions. Where the estimated scene brightness does not match that of a weighting distribution in the defined set, the processing logic may determine the applicable weighting distribution using two adjacent distributions in the set (e.g., adjacent with respect to their associated brightnesses). In some embodiments, for example, the processing logic may linearly interpolate the two adjacent weighting distributions to obtain the applicable weighting distributions. For instance, where the weighting distributions are defined with reference to a set of color temperature limits (e.g., $[O_{C2}, I_{C2}, I_{C1}, O_{C1}]$) and tint limits (e.g., $[O_{T2}, I_{T2}, I_{T1}, O_{T1}]$), as in Equation 3, the parameters may be interpolated to define a new set of color temperature and tint limits for a new weighting distribution. The new weighting distribution may serve as the applicable weighting distribution and the output of operation 320 (and method 300).

FIG. 4 illustrates a flow diagram of an example auto white balancing method 400 for white balancing an image in accordance with some embodiments of the present disclosure. The auto white balancing method 400 may be performed by processing logic of a computing device (e.g., using processor 122 of computing device 120 shown in FIG. 1).

At operation 410, the processing logic may acquire image data containing a set of pixels that form an image. The image may capture a physical scene illuminated by an illuminant. The image data may also include metadata information regarding the image. The image may have a particular resolution and conform to a particular format. The image, for example, may have a resolution of 1024×768 pixels and may be in a RAW16 format. The metadata information may indicate a color filter array (CFA) that was used to capture the image, which may indicate the number and type of color channels included in the image. The image, for example, may have been captured using a Bayer filter, resulting in a red, a blue, and two green color channels (e.g., RGGB). The image data may be acquired from an image capture device (e.g., image capture device 110 via communication interface 126), which may have captured the image using an image sensor (e.g., image sensor 115). The processing logic may parse the image data to extract and store the image and metadata information in memory (e.g., in a buffer of memory 124).

At operation 420, the processing logic may obtain sensor calibration data that reflects the unique response characteristics of the image sensor (e.g., image sensor 115) that was used to capture the image (e.g., acquired at operation 410). The sensor calibration data may include a set of color calibration points, which for example, may reflect the sensor response to a neutral gray object illuminated by a set of illuminants with varying color temperatures. Each point, for instance, may contain the average red, blue, and green intensity value as measured by the image sensor for the neutral gray object at a particular color temperature (e.g., $[r_{gray}, g_{gray}, b_{gray}]$). In some embodiments, the sensor calibration data may also include a brightness calibration factor that characterizes the relationship between a brightness response of the image sensor 115 and a device independent measure of illuminance, such as lux. The brightness calibration factor can be used to convert the brightness response of an image sensor (e.g., an estimated image brightness) into a lux value. The sensor calibration data may have been generated as part of a calibration process previously performed by the computing device and/or an image capture device. The sensor calibration data may be retrieved from disk or acquired from an image capture device (e.g., from image capture device 110 via communication interface 126) and may be parsed to extract the color calibration points and brightness calibration factor, which may be stored in memory (e.g., in a buffer of memory 124).

At operation 425, the processing logic may use the color calibration points (e.g., obtained at block 420) to generate a gray line of the image sensor, which may serve as an approximation of the Planckian Locus for the image sensor. In one embodiment, at block 426, the processing logic may convert a set of gray color calibration points into a UV space, where they may generally fall along a straight line. Then, at block 427, the processing logic may perform a regression analysis on the set of converted gray points to determine a linear or vector expression for the gray line in the UV space. The linear or vector expression of the gray line may serve as the output of operation 425.

At operation 430, the processing logic may process the image that was acquired, e.g., at operation 410, to estimate a color of the illuminant of the image scene. In some embodiments, at block 431, the processing logic may determine local average and clipping information for the image. The processing logic, for example, may divide the image into a number of windows and may apply upper pixel-value limits to identify clipped pixels in each window of the image. In an embodiment, the processing logic may also determine the number of clipped pixels in each window for each color component of the image. The processing logic may then determine local average information for each of the windows, e.g., an average pixel intensity value for each color component in the window. In computing the local average information, the processing logic may exclude those pixels that were clipped. The output of block 431 may be a local average image, where each pixel represents the local average information for a corresponding window of the original image (e.g., $[r_{avg}, b_{avg}, g_{avg}]$). In some embodiments, block 431 may also output a clipped-pixel image, where each pixel represents the number of clipped pixels within a corresponding window (e.g., $[r_{clipped}, b_{clipped}, g_{clipped}]$).

In some embodiments, at block 432, the processing logic may scale the local average image (e.g., generated at block 421) to adjust its pixel values to fall within a desired range. In some embodiments, the processing logic may scale the local average image to reduce the impact that brighter pixels may have in downstream processing. For example, for each pixel of the local average image, the processing logic may determine a maximum color component value (e.g., max $(r_{avg}, b_{avg}, g_{avg})$) and compare the maximum color component value to a desired maximum threshold. If the maximum color component value exceeds the desired maximum threshold, the processing logic may set the maximum color component value to the desired maximum threshold and adjust the remaining color component values to maintain a ratio between the color components. The output of block 432 may be a scaled local average image, where the scaled values of each pixel (e.g., [scaled_$r_{avg}$, scaled_$b_{avg}$, scaled_$g_{avg}$]) fall within a desired range (e.g., do not exceed the desired maximum threshold).

In some embodiments, at block 433, the processing logic may determine a set of weighting factors to apply to the scaled local average image (e.g., generated at block 432) to exclude or minimize the impact of non-neutral portions of the original image (e.g., containing large colored regions or objects). In some embodiments, for example, the processing logic may use a chromaticity weighting function to determine a set of weighting factors to apply to each window (e.g., each pixel) of the local average image using a chromaticity weighting function.

In some embodiments, at sub-block 434, the processing logic may convert the scaled local average image into a chromaticity space. The processing logic, for example, may convert each pixel of the scaled local average image (e.g. [scaled_$r_{avg}$, scaled_$b_{avg}$, scaled_$g_{avg}$] into a UV space. The output of sub-block 434 may be a UV local average image, where each pixel reflects the average chromaticity (e.g., average color without regard to intensity) of a window in the local average image (e.g., [$U_{avg}$, $V_{avg}$]).

In some embodiments, at sub-block 435, the processing logic may determine a weighting factor for each pixel of the UV local average image (e.g., generated at sub-block 434). The processing logic, for example, may pass each pixel of the image into a chromaticity weighting function to determine its corresponding weighting factor. In some embodiments, the weighting function may define a weighting distribution parameterized in terms of a color temperature and tint and defined with reference to a set of color temperature and tint limits, e.g., as in Equation 3. In some embodiments, the weighting function may be further parameterized by brightness. In such embodiments, the processing logic may use an estimated scene brightness to determine an applicable weighting distribution, e.g., as in the method 300 of FIG. 3.

The processing logic may use the weighting distribution to determine the color temperature and tint of each pixel, for example, by orthogonally projecting the pixel onto the gray line (e.g., determined at operation 425) and computing the minimum distance from the gray line, respectively. The processing logic may then determine a corresponding weighting factor γ for the pixel using the weighting function. The output of sub-block 435 (and block 433) may be the set of weighting factors corresponding to each pixel of the UV local average image and may take the form of a weighting factor matrix (or weighting factor image) having the same dimension as the resolution of the UV local average image, where each element of the matrix (or pixel of the image) represents a weighting factor for a corresponding image pixel of the scaled local average image (e.g., generated at block 432).

In some embodiments, at block 436, the processing logic may determine a weighted average image color of the scaled local average image (e.g., generated at block 432). The processing logic, for example, may multiply each pixel of the scaled local average image by a corresponding weighting factor in the weighting factor matrix to produce a weighted local average pixel (e.g., [γ*scaled_$r_{avg}$, γ*scaled_$b_{avg}$, γ*scaled_$g_{avg}$]). The processing logic may then compute an aggregate value of each color component across all weighted local average pixels and divide the resulting values by the sum of the weighting factors that were applied to obtain the weighted average image color (e.g., [$wr_{avg}$, $Wg_{avg}$, $wb_{avg}$]). For clarity, the weighted average image color may be calculated as follows:

$$wr_{avg} = \frac{\sum \gamma * \text{scaled\_r}_{avg}}{\sum \gamma}, \quad (10)$$

$$wg_{avg} = \frac{\sum \gamma * \text{scaled\_g}_{avg}}{\sum \gamma}, \quad wb_{avg} = \frac{\sum \gamma * \text{scaled\_b}_{avg}}{\sum \gamma}$$

The weighted average image color (e.g., [$wr_{avg}$, $Wg_{avg}$, $wb_{avg}$]) may serve as the output of block 436.

In some embodiments, at block 437, the processing logic may use the weighted average image color to estimate an illuminant color of the image. The processing logic, for example, may convert the weighted average image color to the UV space, where it may be projected onto the gray line to obtain an estimated illuminant gray point (e.g., [$U_{wp}$, $V_{wp}$]). The estimated illuminant color may serve as the output of operation 430.

At operation 440, the processing logic may use the estimated illuminant color (e.g., determined at operation 430) to determine a set of white balance correction factors. The processing logic, for example, may use an estimated illuminant gray point to determine an $r_{gain}$ and $b_{gain}$ that when applied to the image will result in pixels of neutral objects having red and blue values equal to their green value. The processing logic, for instance, may convert the illuminant gray point back to the RGB color space to determine the white balance correction factors to be applied. The $r_{gain}$ and $b_{gain}$ values may serve as the output of operation 440.

At operation 450, the processing logic may apply the white balance correction factors (e.g., $r_{gain}$ and $b_{gain}$ determined at operation 440) to the image (e.g., acquired at operation 410) to produce a white balanced image. The processing logic, for example, may multiply each red pixel value in the image by $r_{gain}$ and each blue pixel value in the image by $b_{gain}$ to produce a white balanced image, which may serve as the output of operation 450 (and method 400).

Figure 5A:
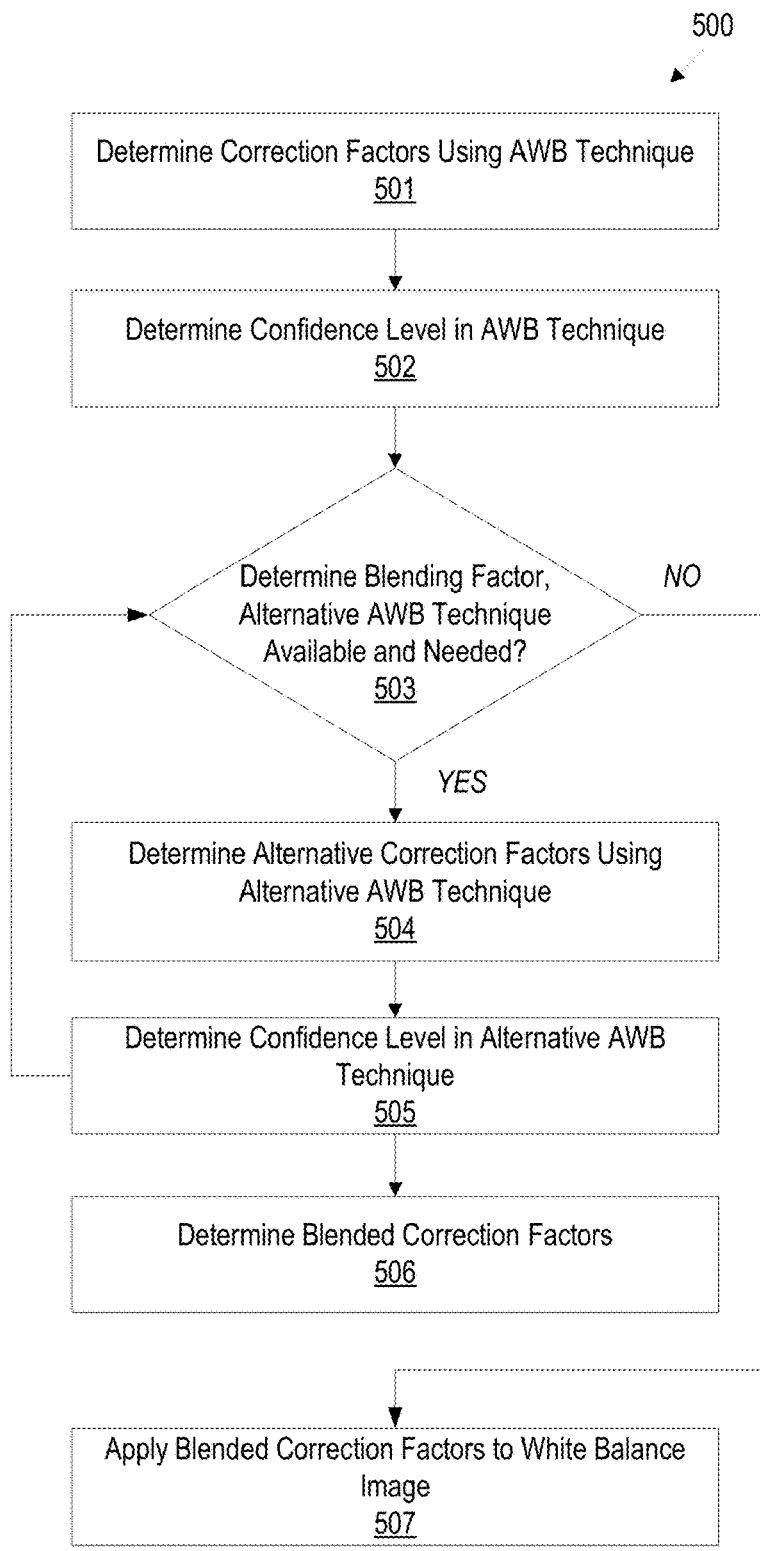
FIG. 5A illustrates a flow diagram of an example method for auto white balancing an image using a fallback mechanism in accordance with some embodiments of the present disclosure.

FIG. 5A illustrates a flow diagram of an example method 500 for auto white balancing an image using a fallback mechanism in accordance with some embodiments of the present disclosure. The auto white balancing method 500 may be performed by processing logic of a computing device (e.g., using processor 122 of computing device 120 shown in FIG. 1).

At operation 501, the processing logic may determine a set of white balance correction factors using an auto white balancing technique. The processing logic, for example, may perform the auto white balance method illustrated in and described above with reference to FIG. 4, obtaining the corrective white balance gains at operation 440.

At operation 502, the processing logic may determine a confidence level in the auto white balancing technique and the white balance correction factors that were produced (e.g., at operation 501). In some embodiments, for example, where the white balancing technique involves the application of a weighting function (e.g., as in the auto white balance method of FIG. 4), the processing logic may determine a level of confidence based on an assessment of whether a sufficient number or amount of pixels remained after applying the weighting function. The processing logic, for instance, may compute an average weighting applied to the image as the ratio between the sum of the weighting factors applied to a local average image (e.g., the scaled local average image obtained at block 432) multiplied by the number of available pixels in a corresponding window of an original image (e.g., that were not clipped or excluded in determining the local average and clipping information at block 431), and the total number of pixels in the original image available for weighting. In some embodiments, the processing logic may compute a ratio for each color component of the image—e.g., modulating the weighting factors by the number of available pixels for each color component and dividing by the total number of available pixels for the color component—and identify the minimum ratio as the confidence level for the white balancing technique.

At operation 503, the processing logic may determine whether an alternative white balance technique is available and should be considered along with a blending factor for blending the white balance correction factors. The processing logic, for example, may use the confidence level (e.g., determined at operation 502) as an input to a blending function to obtain a blending factor. The processing logic, for example, may use the blending function of Equation 5 with $Conf_{Low}$ and $Conf_{High}$ thresholds tuned for the auto white balance technique (e.g., employed at operation 501). In some embodiments, the blending function may return a blending factor of one (e.g., when the confidence level exceeds the $Conf_{High}$ threshold in Equation 5), and the processing logic may conclude that there is no need to fall back to an alternative white balancing technique. In such cases, the processing logic may accept the white balance correction factors that were produced (e.g., at operation 501) and method 500 may complete (e.g., without performing the operations that follow). If not, the method 500 may proceed to operation 504.

At operation 504, the processing logic may determine an alternative set of white balance correction factors using an alternative white balancing technique. In some embodiments, for example, the processing logic may perform an alternative white balancing technique that does not involve applying a weighting function. An alternative embodiment of the method 400 of FIG. 4, for instance, may involve computing a simple average image color instead of a weighted average image color. For example, instead of performing blocks 433-436, the processing logic may compute an average pixel value for each color component of the scaled local average image. Similar to block 437, the processing logic may convert the simple average image color to the UV space and project it onto the gray line to obtain the estimated illuminant color. The processing logic may use the estimated illuminant gray point to determine an alternative set of white balance correction factors (e.g., similar to block 440).

At operation 505, the processing logic may determine a confidence level in the alternative auto white balance technique and the alternative white balancing factors that were produced (e.g., at operation 504). In some embodiments, for example, where the alternative white balancing technique involves normalizing or scaling an image (e.g., as in the alternative embodiment of the method 400 of FIG. 4 described in operation 504 above) the processing logic may determine a level of confidence based on an on an assessment of the number of pixels that were clipped, such that normalizing or scaling the image would not have been reliably performed. The processing logic, for example, may compute a ratio between the number of available pixels (i.e., that were not clipped or excluded) for each color component of the image and the total number of pixels for the color component in the image. The processing logic may identify the minimum ratio as the confidence level for the alternative white balancing technique.

At operation 506, the processing logic may use the initial white balance correction factors (e.g., determined at operation 501), the blending factor (e.g., determined at operation 503), and the alternative set of white balance correction factors (e.g., determined at operation 504) to determine a set of blended correction factors. The processing logic, for example, may use the blending factor to alpha-blend the initial white balance correction factors with the alternative white balance correction factors (e.g., using Equation 6 as discussed above).

In some embodiments, the process may repeat, e.g., operations 503-506, for one or more additional white balancing techniques.

By way of example, in a next iteration, operation 503 may be repeated with the blended correction factors (e.g., determined in a previous iteration at operation 506) and confidence level in the alternative white balancing technique (e.g., determined in a previous iteration at operation 505) being treated as the input. The processing logic, for example, may determine whether an additional white balancing technique should be considered along with an additional blending factor for further blending the white balance correction factors. The processing logic, for instance, may use the confidence level in the alternative white balance technique as an input to a blending function to obtain a blending factor. The processing logic, for example, may use the blending function of Equation 5 with $Conf_{Low}$ and $Conf_{High}$ thresholds tuned for the alternative auto white balance technique used in the previous iteration (e.g., at operation 504). If the blending function returns a blending factor of one, the method 500 may complete. If not, the processing logic may repeat operation 504 and determine an additional set of white balance correction factors and repeat operation 505 to determine a confidence level in the technique employed therein. In some embodiments, for example, the method 500 may rely upon the auto white balance techniques described in U.S. patent application Ser. No. 16/742,322, entitled "WEIGHTED NORMALIZED AUTOMATIC WHITE BALANCING," the contents of which are incorporated herein by reference in their entirety. Operation 506 may then be repeated to further blend the blended correction factors (e.g., determined in a previous iteration at operation 506) with the additional white balance correction factors and blending factor that was determined (e.g., in repeating operations 503 and 504).

The process may repeat until no additional auto white balance techniques are available (e.g., determining the confidence level of a final white balance technique to be one). In some embodiments, the final iteration may rely upon manually defined white balance correction factors. In some embodiments, for example, the processing logic may determine the white balance correction factors using a set of correction factors that are manually defined for varying brightnesses (e.g., as in Table 1). The processing logic may estimate a scene brightness–e.g., in a similar manner to operation 310 in the method 300 of FIG. 3—and may select a matching set of white balance correction factors (e.g., having a same associated brightness) or linearly interpolate the white balance correction factors defined for the two brightness levels adjacent thereto.

At operation 507, the final blended white balance correction factors may be applied to the image to white balance the image (e.g., as in operation 450 of the method of FIG. 4).

Figure 5B:
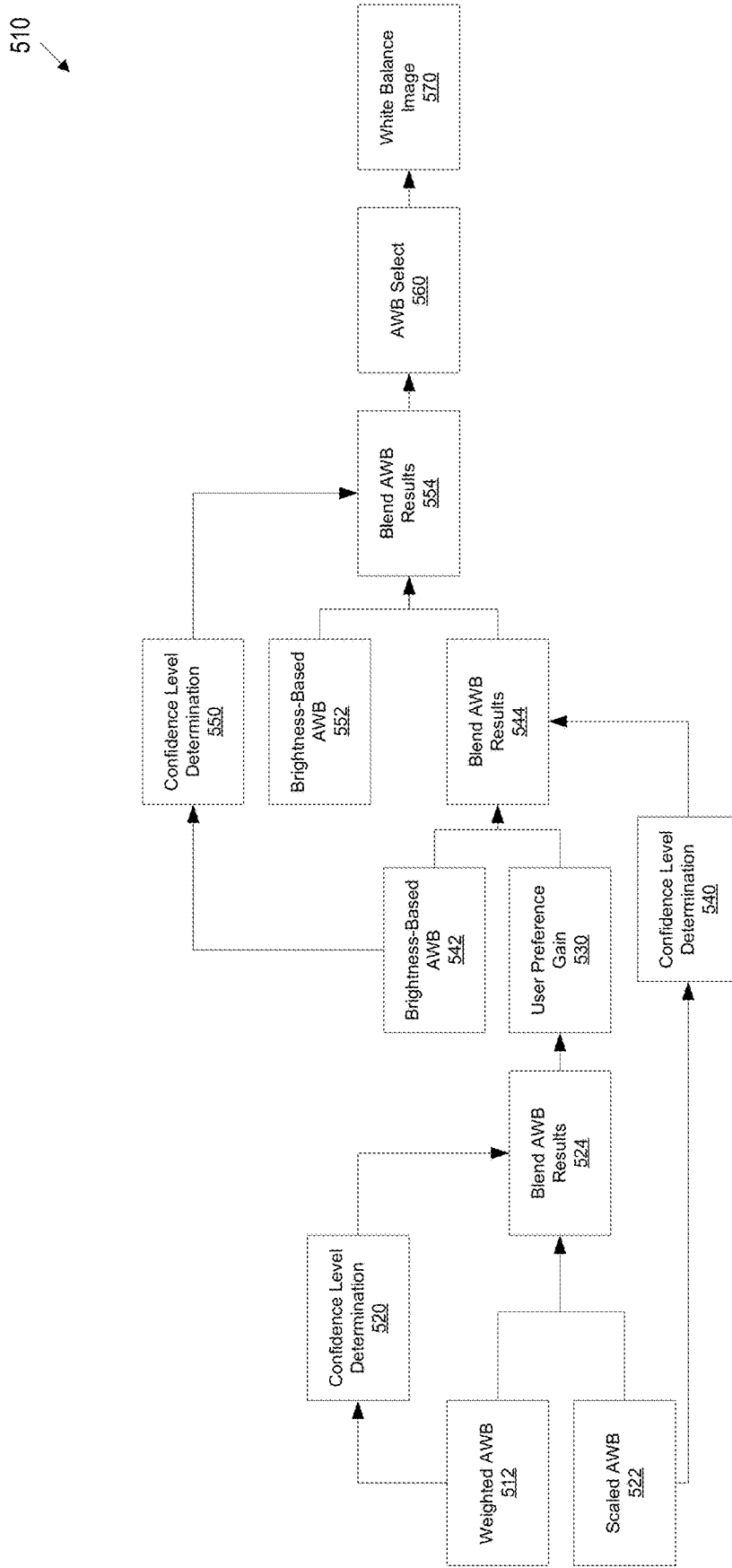
FIG. 5B illustrates a block diagram of an example method for auto white balancing an image by blending multiple auto white balance techniques in accordance with some embodiments of the present disclosure.

FIG. 5B illustrates a block diagram of an example method 510 for auto white balancing an image by blending multiple auto white balance techniques in accordance with some embodiments of the present disclosure. The auto white balancing method 510 may be performed by processing logic of a computing device (e.g., using processor 122 of computing device 120 shown in FIG. 1).

At block 512, the processing logic may determine an initial set of white balance correction factors for an image using an initial auto white balancing technique, for example, that employs a weighting function to exclude or minimize the impact of non-neutral portions of the original image (e.g., containing large colored regions or objects). The processing logic, for instance, may perform the auto white balance method illustrated in and described above with reference to FIG. 4, and may obtain an estimated illuminant gray point (at operation 430) and determine a set of white balance correction factors (at operation 440).

At block 520, the processing logic may determine a confidence level in the auto white balancing technique used at block 512. The processing logic, for example, may determine a level of confidence in the auto white balance method of FIG. 4 in a similar manner to that described above with regard to operation 502 of the method 500 of FIG. 5A.

At block 522, the processing logic may use an alternative auto white balance technique to determine an alternative set of white balance correction factors. The processing logic, for example, may employ an alternative white balance technique that involves scaling an image, e.g., to reduce the impact that brighter pixels may have in computing an average image color. The processing logic, for instance, may perform the alternative auto white balancing technique described above with regard to the method 500 of FIG. 5A.

At block 524, the processing logic may use the confidence level generated at block 520 to determine a blending factor, e.g., in a similar manner to that described above with regard to operation 503 of the method 500 of FIG. 5A. The processing logic, for example, may use the confidence level as an input to a blending function (e.g., the blending function of Equation 5) to obtain a blending factor. The processing logic may then use the blending factor to blend the initial set of white balance correction factors (e.g., generated at block 512) and the alternative set of white balance correction factors (e.g., generated at block 522). The processing logic, for example, may alpha-blend the initial white balance correction factors with the alternative white balance correction factors (e.g., using Equation 6 discussed above).

At block 530, the processing logic may apply a user preference gain to adjust the blended white balance correction factors generated at block 524. The processing logic, for example, may multiply each of the blended white balance correction factors by the user preference gain to obtain adjusted white balance correction factors.

At block 540, the processing logic may determine a confidence level in the alternative auto white balancing technique used at block 522. The processing logic, for example, may determine a level of confidence in a similar manner to that described above with regard to operation 502 of the method 500 of FIG. 5A.

At block 542, the processing logic may use an additional white balance technique to determine an additional set of white balance correction factors. The processing logic, for example, may employ a brightness-based auto white balancing technique wherein additional white balance correction factors can be determined based on a scene brightness of the image. The processing logic, for instance, may use an estimated scene brightness to select (or otherwise determine) the correction factors from a set of correction factors manually defined for varying brightnesses (e.g., as in Table 1) in a similar manner to that described above with regard to the method 500 of FIG. 5A.

At block 544, the processing logic may use the confidence level generated at block 540 to determine a blending factor, e.g., in a similar manner to that described above with regard to the method 500 of FIG. 5A. The processing logic, for example, may use the confidence level as an input to a blending function (e.g., the blending function of Equation 5) to obtain a blending factor. The processing logic may then use the blending factor to further blend the adjusted set of white balance correction factors (e.g., generated at block 524 and adjusted at block 530) and the additional set of white balance correction factors (e.g., generated at block 542). The processing logic, for example, may alpha-blend the adjusted white balance correction factors with the additional white balance correction factors (e.g., using Equation 6 discussed above).

At block 550, the processing logic may determine a confidence level in the additional auto white balancing technique used at block 542. The processing logic, for example, may determine a level of confidence based on an assessment of the reliability of the scene brightness estimate that was used to determine the additional set of white balance correction factors. The processing logic, for instance, may compute an average value of a color component of the image (e.g., an average green channel or white channel value). If the average value fails to meet certain threshold criteria the technique may be relatively unreliable. For instance, if the average color component value falls below a minimum threshold, or between a low and high threshold, the scene may be too dimly lit (e.g., if captured at night) for the technique to be entirely reliable. The processing logic may determine the confidence level to be a normalized distance of the average value from the threshold criteria (e.g., such that it falls between zero and one).

At block 552, the processing logic may use another white balance technique to determine another set of white balance correction factors. The processing logic, for example, may employ another brightness based white balancing technique, e.g., that is optimized for processing images captured at night.

At block 554, the processing logic may use the confidence level generated at block 550 to determine a blending factor. The processing logic, for example, may use the confidence level as the blending factor, or may use the confidence level as an input to a blending function (e.g., the blending function of Equation 5) to obtain a blending factor. The processing logic may then use the blending factor to further blend the blended white balance correction factors (e.g., generated at block 544) and the another set of white balance correction factors (e.g., generated at block 552). The processing logic, for example, may alpha-blend the blended white balance correction factors with the another white balance correction factors (e.g., using Equation 6 discussed above).

At block 560, the processing logic may determine whether to rely upon the auto white balance factors generated through block 554 or fall back to a manually defined set of white balance correction factors.

At block 570, the final set of auto white balance factors generated at block 554 or manually defined white balance correction factors selected at block 560 may be applied to the image to white balance the image (e.g., as in operation 450 of the method of FIG. 4).

Figure 6A:
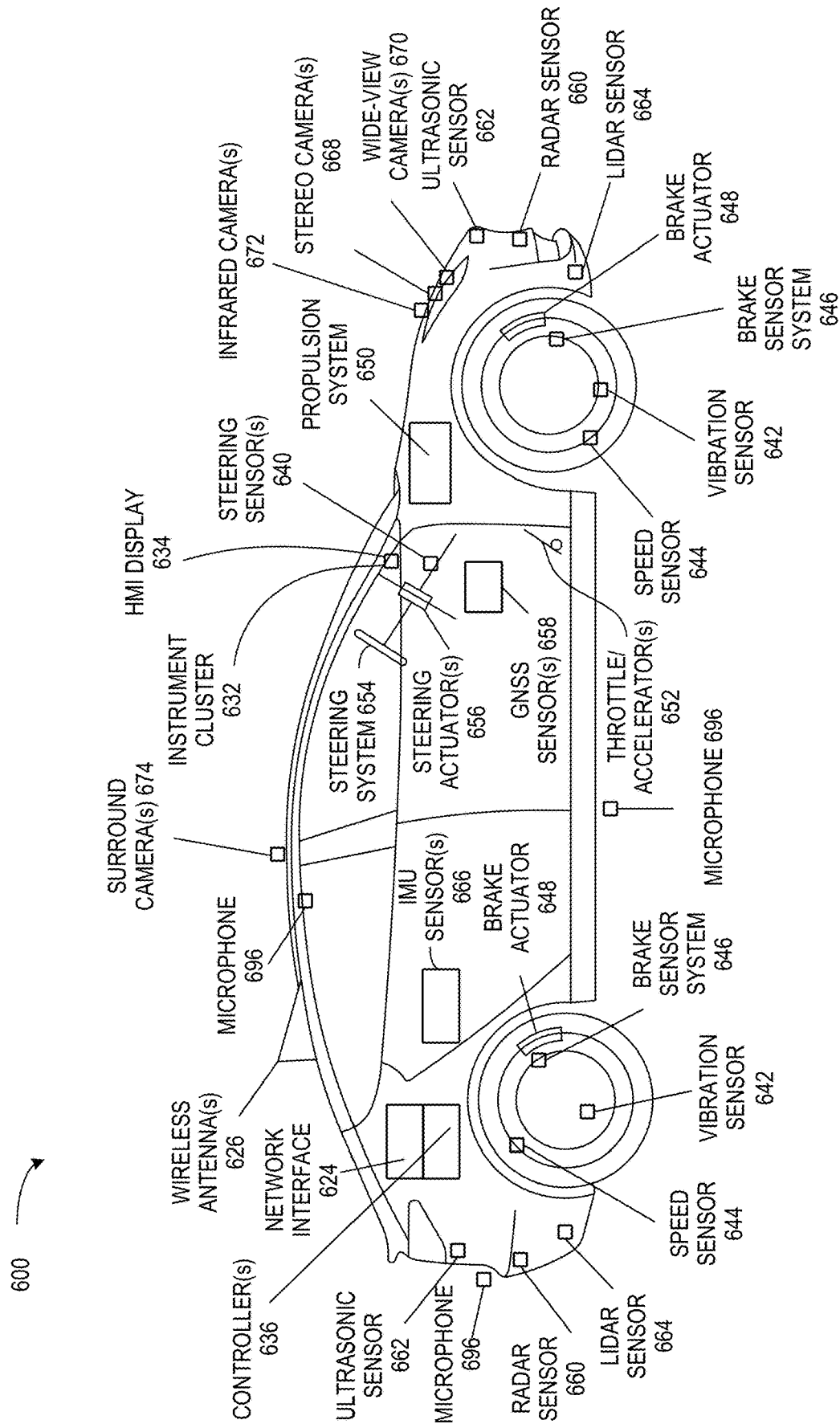
FIG. 6A illustrates an example of an autonomous vehicle, according to at least one embodiment.

FIG. 6A illustrates an example of an autonomous vehicle 600, according to at least one embodiment. In at least one embodiment, autonomous vehicle 600 (alternatively referred to herein as "vehicle 600") may be, without limitation, a passenger vehicle, such as a car, a truck, a bus, and/or another type of vehicle that accommodates one or more passengers. In at least one embodiment, vehicle 600 may be a semi-tractor-trailer truck used for hauling cargo. In at least one embodiment, vehicle 600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles"

(e.g., Standard No. J3016-201806, published on Jun. 15, 2018, Standard No. J3016-201609, published on Sep. 30, 2016, and previous and future versions of this standard). In at least one embodiment, vehicle 600 may be capable of functionality in accordance with one or more of Level 1 through Level 5 of autonomous driving levels. For example, in at least one embodiment, vehicle 600 may be capable of conditional automation (Level 3), high automation (Level 4), and/or full automation (Level 5), depending on embodiment.

In at least one embodiment, vehicle 600 may include, without limitation, components such as a chassis, a vehicle body, wheels (e.g., 2, 4, 6, 8, 18, etc.), tires, axles, and other components of a vehicle. In at least one embodiment, vehicle 600 may include, without limitation, a propulsion system 650, such as an internal combustion engine, hybrid electric power plant, an all-electric engine, and/or another propulsion system type. In at least one embodiment, propulsion system 650 may be connected to a drive train of vehicle 600, which may include, without limitation, a transmission, to enable propulsion of vehicle 600. In at least one embodiment, propulsion system 650 may be controlled in response to receiving signals from a throttle/accelerator(s) 652.

In at least one embodiment, a steering system 654, which may include, without limitation, a steering wheel, is used to steer vehicle 600 (e.g., along a desired path or route) when propulsion system 650 is operating (e.g., when vehicle 600 is in motion). In at least one embodiment, steering system 654 may receive signals from steering actuator(s) 656. In at least one embodiment, a steering wheel may be optional for full automation (Level 5) functionality. In at least one embodiment, a brake sensor system 646 may be used to operate vehicle brakes in response to receiving signals from brake actuator(s) 648 and/or brake sensors.

In at least one embodiment, controller(s) 636, which may include, without limitation, one or more system on chips ("SoCs") (not shown in FIG. 6A) and/or graphics processing unit(s) ("GPU(s)"), provide signals (e.g., representative of commands) to one or more components and/or systems of vehicle 600. For instance, in at least one embodiment, controller(s) 636 may send signals to operate vehicle brakes via brake actuator(s) 648, to operate steering system 654 via steering actuator(s) 656, to operate propulsion system 650 via throttle/accelerator(s) 652. In at least one embodiment, controller(s) 636 may include one or more onboard (e.g., integrated) computing devices that process sensor signals, and output operation commands (e.g., signals representing commands) to enable autonomous driving and/or to assist a human driver in driving vehicle 600. In at least one embodiment, controller(s) 636 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 636 provide signals for controlling one or more components and/or systems of vehicle 600 in response to sensor data received from one or more sensors (e.g., sensor inputs). In at least one embodiment, sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit ("IMU") sensor(s) 666 (e.g., accelerometer(s), gyroscope(s), a magnetic compass or magnetic compasses, magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range cameras (not shown in FIG. 6A), mid-range camera(s) (not shown in FIG. 6A), speed sensor(s) 644 (e.g., for measuring speed of vehicle 400), vibration sensor(s) 642, steering sensor(s) 640, brake sensor(s) (e.g., as part of brake sensor system 446), and/or other sensor types.

In at least one embodiment, one or more of controller(s) 636 may receive inputs (e.g., represented by input data) from an instrument cluster 632 of vehicle 600 and provide outputs (e.g., represented by output data, display data, etc.) via a human-machine interface ("HMI") display 634, an audible annunciator, a loudspeaker, and/or via other components of vehicle 600. In at least one embodiment, outputs may include information such as vehicle velocity, speed, time, map data (e.g., a High Definition map (not shown in FIG. 6A), location data (e.g., vehicle's 600 location, such as on a map), direction, location of other vehicles (e.g., an occupancy grid), information about objects and status of objects as perceived by controller(s) 636, etc. For example, in at least one embodiment, HMI display 634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 600 further includes a network interface 624 which may use wireless antenna(s) 626 and/or modem(s) to communicate over one or more networks. For example, in at least one embodiment, network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the autonomous vehicle 600 of FIG. 6A for performing image processing operations, including white balancing operations.

Figure 6B:
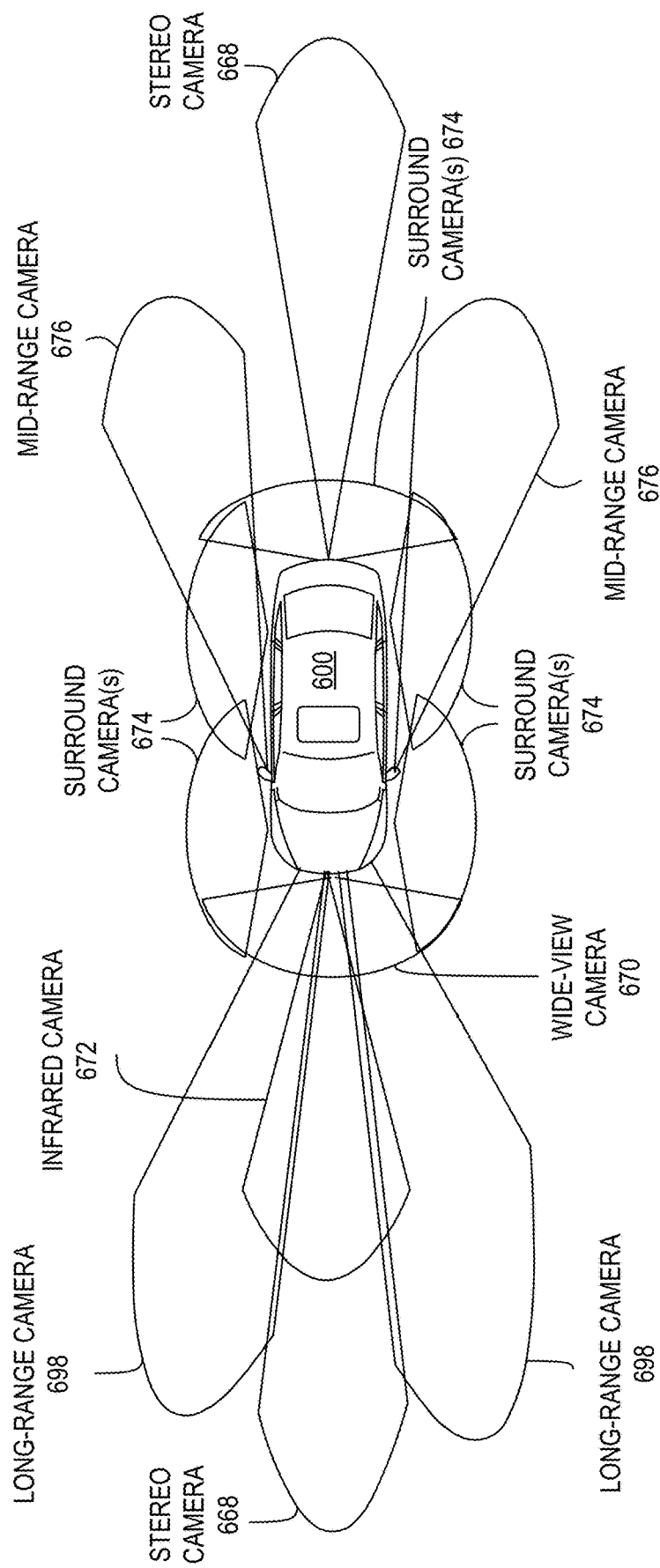
FIG. 6B illustrates an example of camera locations and fields of view for the autonomous vehicle of FIG. 6A, according to at least one embodiment.

FIG. 6B illustrates an example of camera locations and fields of view for autonomous vehicle 600 of FIG. 6A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 600.

In at least one embodiment, camera types for cameras may include, but are not limited to, digital cameras that may be adapted for use with components and/or systems of vehicle 600. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within vehicle 600 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 600 (e.g., front-facing cameras) may be used for surround view, to help identify forward facing paths and obstacles, as well as aid in, with help of one or more of controller(s) 636 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 670 may be used to perceive objects coming into view from a periphery (e.g., pedestrians, crossing traffic or bicycles). Although only one wide-view camera 670 is illustrated in FIG. 6B, in other embodiments, there may be any number (including zero) wide-view cameras on vehicle 600. In at least one embodiment, any number of long-range camera(s) 698 (e.g., a long-view stereo camera pair) may be used for depth-based object detection, especially for objects for which a neural network has not yet been trained. In at least one embodiment, long-range camera(s) 698 may also be used for object detection and classification, as well as basic object tracking.

In at least one embodiment, any number of stereo camera(s) 668 may also be included in a front-facing configuration. In at least one embodiment, one or more of stereo camera(s) 668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 600, including a distance estimate for all points in an image. In at least one embodiment, one or more of stereo camera(s) 668 may include, without limitation, compact stereo vision sensor(s) that may include, without limitation, two camera lenses (one each on left and right) and an image processing chip that may measure distance from vehicle 600 to target object and use generated information (e.g., metadata) to activate autonomous emergency braking and lane departure warning functions. In at least one embodiment, other types of stereo camera(s) 668 may be used in addition to, or alternatively from, those described herein.

In at least one embodiment, cameras with a field of view that include portions of environment to sides of vehicle 600 (e.g., side-view cameras) may be used for surround view, providing information used to create and update an occupancy grid, as well as to generate side impact collision warnings. For example, in at least one embodiment, surround camera(s) 674 (e.g., four surround cameras as illustrated in FIG. 6B) could be positioned on vehicle 600. In at least one embodiment, surround camera(s) 674 may include, without limitation, any number and combination of wide-view cameras, fisheye camera(s), 360-degree camera(s), and/or similar cameras. For instance, in at least one embodiment, four fisheye cameras may be positioned on a front, a rear, and sides of vehicle 600. In at least one embodiment, vehicle 600 may use three surround camera(s) 674 (e.g., left, right, and rear), and may leverage one or more other camera(s) (e.g., a forward-facing camera) as a fourth surround-view camera.

In at least one embodiment, cameras with a field of view that include portions of an environment behind vehicle 600 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 698 and/or mid-range camera(s) 676, stereo camera(s) 468), infrared camera(s) 672, etc.), as described herein.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the autonomous vehicle 600 of FIG. 6B for performing image processing operations, including white balancing operations.

Figure 6C:
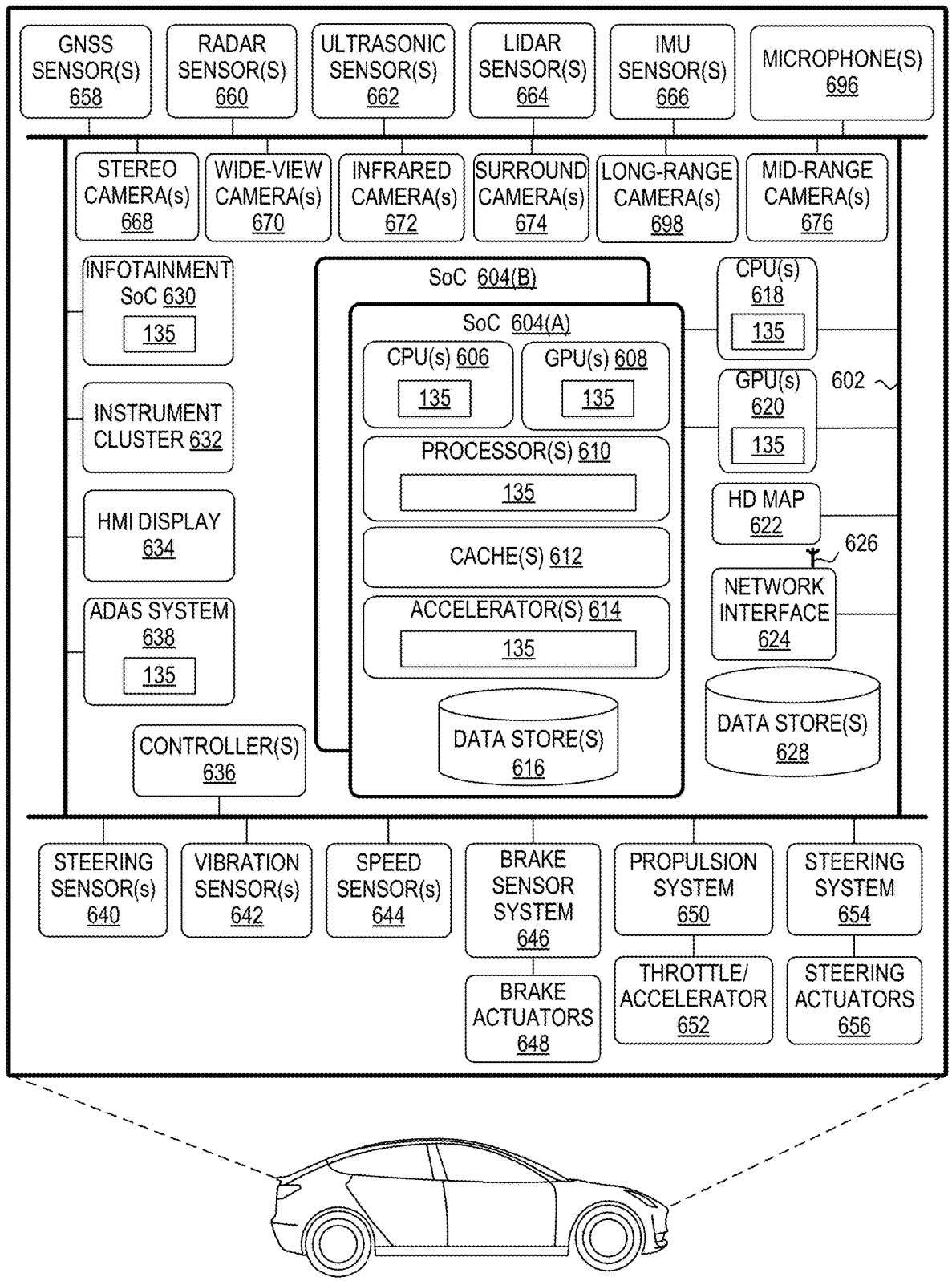
FIG. 6C is a block diagram illustrating an example system architecture for the autonomous vehicle of FIG. 6A, according to at least one embodiment.

FIG. 6C is a block diagram illustrating an example system architecture for autonomous vehicle 600 of FIG. 6A, according to at least one embodiment. In at least one embodiment, each of components, features, and systems of vehicle 600 in FIG. 6C is illustrated as being connected via a bus 602. In at least one embodiment, bus 602 may include, without limitation, a CAN data interface (alternatively referred to herein as a "CAN bus"). In at least one embodiment, a CAN may be a network inside vehicle 600 used to aid in control of various features and functionality of vehicle 600, such as actuation of brakes, acceleration, braking, steering, windshield wipers, etc. In at least one embodiment, bus 602 may be configured to have dozens or even hundreds of nodes, each with its own unique identifier (e.g., a CAN ID). In at least one embodiment, bus 602 may be read to find steering wheel angle, ground speed, engine revolutions per minute ("RPMs"), button positions, and/or other vehicle status indicators. In at least one embodiment, bus 602 may be a CAN bus that is ASIL B compliant.

In at least one embodiment, in addition to, or alternatively from CAN, FlexRay and/or Ethernet protocols may be used. In at least one embodiment, there may be any number of busses forming bus 602, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 602 may communicate with any of components of vehicle 600, and two or more busses of bus 602 may communicate with corresponding components. In at least one embodiment, each of any number of system(s) on chip(s) ("SoC(s)") 604 (such as SoC 404(A) and SoC 404(B), each of controller(s) 636, and/or each computer within vehicle may have access to same input data (e.g., inputs from sensors of vehicle 400), and may be connected to a common bus, such CAN bus.

In at least one embodiment, vehicle 600 may include one or more controller(s) 636, such as those described herein with respect to FIG. 6A. In at least one embodiment, controller(s) 636 may be used for a variety of functions. In at least one embodiment, controller(s) 636 may be coupled to any of various other components and systems of vehicle 600, and may be used for control of vehicle 600, artificial intelligence of vehicle 600, infotainment for vehicle 600, and/or other functions.

In at least one embodiment, vehicle 600 may include any number of SoCs 604. In at least one embodiment, each of SoCs 604 may include, without limitation, central processing units ("CPU(s)") 606, graphics processing units ("GPU(s)") 608, processor(s) 610, cache(s) 612, accelerator(s) 614, data store(s) 616, and/or other components and features not illustrated. In at least one embodiment, SoC(s) 604 may be used to control vehicle 600 in a variety of platforms and systems. For example, in at least one embodiment, SoC(s) 604 may be combined in a system (e.g., system of vehicle 400) with a High Definition ("HD") map 622 which may obtain map refreshes and/or updates via network interface 624 from one or more servers (not shown in FIG. 6C).

In at least one embodiment, CPU(s) 606 may include a CPU cluster or CPU complex (alternatively referred to herein as a "CCPLEX"). In at least one embodiment, CPU(s) 606 may include multiple cores and/or level two ("L2") caches. For instance, in at least one embodiment, CPU(s) 606 may include eight cores in a coherent multi-processor configuration. In at least one embodiment, CPU(s) 606 may include four dual-core clusters where each cluster has a dedicated L2 cache (e.g., a 2 megabyte (MB) L2 cache). In at least one embodiment, CPU(s) 606 (e.g., CCPLEX) may be configured to support simultaneous cluster operations enabling any combination of clusters of CPU(s) 606 to be active at any given time.

In at least one embodiment, one or more of CPU(s) 606 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 606 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 608 may include an integrated GPU (alternatively referred to herein as an "iGPU"). In at least one embodiment, GPU(s) 608 may be programmable and may be efficient for parallel workloads. In at least one embodiment, GPU(s) 608 may use an enhanced tensor instruction set. In at least one embodiment, GPU(s) 608 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 608 may include at least eight streaming microprocessors. In at least one embodiment, GPU(s) 608 may use compute application programming interface(s) (API(s)). In at least one embodiment, GPU(s) 608 may use one or more parallel computing platforms and/or programming models (e.g., NVIDIA's CUDA model).

In at least one embodiment, one or more of GPU(s) 608 may be power-optimized for best performance in automotive and embedded use cases. For example, in at least one embodiment, GPU(s) 608 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 608 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 608 may include unified memory technology. In at least one embodiment, address translation services ("ATS") support may be used to allow GPU(s) 608 to access CPU(s) 606 page tables directly. In at least one embodiment, embodiment, when a GPU of GPU(s) 608 memory management unit ("MMU") experiences a miss, an address translation request may be transmitted to CPU(s) 606. In response, 2 CPU of CPU(s) 606 may look in its page tables for a virtual-to-physical mapping for an address and transmit translation back to GPU(s) 608, in at least one embodiment. In at least one embodiment, unified memory technology may allow a single unified virtual address space for memory of both CPU(s) 606 and GPU(s) 608, thereby simplifying GPU(s) 608 programming and porting of applications to GPU(s) 608.

In at least one embodiment, GPU(s) 608 may include any number of access counters that may keep track of frequency of access of GPU(s) 608 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 604 may include any number of cache(s) 612, including those described herein. For example, in at least one embodiment, cache(s) 612 could include a level three ("L3") cache that is available to both CPU(s) 606 and GPU(s) 608 (e.g., that is connected to CPU(s) 606 and GPU(s) 408). In at least one embodiment, cache(s) 612 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 604 may include one or more accelerator(s) 614 (e.g., hardware accelerators, software accelerators, or a combination thereof). In at least one embodiment, SoC(s) 604 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 608 and to off-load some of tasks of GPU(s) 608 (e.g., to free up more cycles of GPU(s) 608 for performing other tasks). In at least one embodiment, accelerator(s) 614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 614 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 608, and by using an inference accelerator, for example, a designer may target either DLA(s) or GPU(s) 608 for any function. For example, in at least one embodiment, a designer may focus processing of CNNs and floating point operations on DLA(s) and leave other functions to GPU(s) 608 and/or accelerator(s) 614.

In at least one embodiment, accelerator(s) 614 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 638, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 606. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 614 may include a computer vision network on-chip and static random-access memory ("SRAM"), for providing a high-bandwidth, low latency SRAM for accelerator(s) 614. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 614 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 600, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 6D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 666 that correlates with vehicle 600 orientation, distance, 3D location estimates of object obtained from neural network and/or other sensors (e.g., LIDAR sensor(s) 664 or RADAR sensor(s) 460), among others.

In at least one embodiment, one or more of SoC(s) 604 may include data store(s) 616 (e.g., memory). In at least one embodiment, data store(s) 616 may be on-chip memory of SoC(s) 604, which may store neural networks to be executed on GPU(s) 608 and/or a DLA. In at least one embodiment, data store(s) 616 may be large enough in capacity to store multiple instances of neural networks for redundancy and safety. In at least one embodiment, data store(s) 616 may comprise L2 or L3 cache(s).

In at least one embodiment, one or more of SoC(s) 604 may include any number of processor(s) 610 (e.g., embedded processors). In at least one embodiment, processor(s) 610 may include a boot and power management processor that may be a dedicated processor and subsystem to handle boot power and management functions and related security enforcement. In at least one embodiment, a boot and power management processor may be a part of a boot sequence of SoC(s) 604 and may provide runtime power management services. In at least one embodiment, a boot power and management processor may provide clock and voltage programming, assistance in system low power state transitions, management of SoC(s) 604 thermals and temperature sensors, and/or management of SoC(s) 604 power states. In at least one embodiment, each temperature sensor may be implemented as a ring-oscillator whose output frequency is proportional to temperature, and SoC(s) 604 may use ring-oscillators to detect temperatures of CPU(s) 606, GPU(s) 608, and/or accelerator(s) 614. In at least one embodiment, if temperatures are determined to exceed a threshold, then a boot and power management processor may enter a temperature fault routine and put SoC(s) 604 into a lower power state and/or put vehicle 600 into a chauffeur to safe stop mode (e.g., bring vehicle 600 to a safe stop).

In at least one embodiment, processor(s) 610 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 610 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 610 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 610 may further include a real-time camera engine that may include, without limitation, a dedicated processor subsystem for handling real-time camera management. In at least one embodiment, processor(s) 610 may further include a high-dynamic range signal processor that may include, without limitation, an image signal processor that is a hardware engine that is part of a camera processing pipeline.

In at least one embodiment, processor(s) 610 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 670, surround camera(s) 674, and/or on in-cabin monitoring camera sensor(s). In at least one embodiment, in-cabin monitoring camera sensor(s) are preferably monitored by a neural network running on another instance of SoC 604, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 608 are not required to continuously render new surfaces. In at least one embodiment, when GPU(s) 608 are powered on and active doing 3D rendering, a video image compositor may be used to offload GPU(s) 608 to improve performance and responsiveness.

In at least one embodiment, one or more SoC of SoC(s) 604 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 604 may further include an input/output controller(s) that may be controlled by software and may be used for receiving I/O signals that are uncommitted to a specific role.

In at least one embodiment, one or more Soc of SoC(s) 604 may further include a broad range of peripheral interfaces to enable communication with peripherals, audio encoders/decoders ("codecs"), power management, and/or other devices. In at least one embodiment, SoC(s) 604 may be used to process data from cameras (e.g., connected over Gigabit Multimedia Serial Link and Ethernet channels), sensors (e.g., LIDAR sensor(s) 664, RADAR sensor(s) 660, etc. that may be connected over Ethernet channels), data from bus 602 (e.g., speed of vehicle 600, steering wheel position, etc.), data from GNSS sensor(s) 658 (e.g., connected over a Ethernet bus or a CAN bus), etc. In at least one embodiment, one or more SoC of SoC(s) 604 may further include dedicated high-performance mass storage controllers that may include their own DMA engines, and that may be used to free CPU(s) 606 from routine data management tasks.

In at least one embodiment, SoC(s) 604 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 604 may be faster, more reliable, and even more energy-efficient and space-efficient than conventional systems. For example, in at least one embodiment, accelerator(s) 614, when combined with CPU(s) 606, GPU(s) 608, and data store(s) 616, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 420) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 608.

In at least one embodiment, a CNN for facial recognition and vehicle owner identification may use data from camera sensors to identify presence of an authorized driver and/or owner of vehicle 600. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 604 provide for security against theft and/or carjacking.

In at least one embodiment, a CNN for emergency vehicle detection and identification may use data from microphones 696 to detect and identify emergency vehicle sirens. In at least one embodiment, SoC(s) 604 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 658. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 662, until emergency vehicles pass.

In at least one embodiment, vehicle 600 may include CPU(s) 618 (e.g., discrete CPU(s), or dCPU(s)), that may be coupled to SoC(s) 604 via a high-speed interconnect (e.g., PCIe). In at least one embodiment, CPU(s) 618 may include an X86 processor, for example. CPU(s) 618 may be used to perform any of a variety of functions, including arbitrating potentially inconsistent results between ADAS sensors and SoC(s) 604, and/or monitoring status and health of controller(s) 636 and/or an infotainment system on a chip ("infotainment SoC") 630, for example.

In at least one embodiment, vehicle 600 may include GPU(s) 620 (e.g., discrete GPU(s), or dGPU(s)), that may be coupled to SoC(s) 604 via a high-speed interconnect (e.g., NVIDIA's NVLINK channel). In at least one embodiment, GPU(s) 620 may provide additional artificial intelligence functionality, such as by executing redundant and/or different neural networks and may be used to train and/or update neural networks based at least in part on input (e.g., sensor data) from sensors of a vehicle 600.

In at least one embodiment, vehicle 600 may further include network interface 624 which may include, without limitation, wireless antenna(s) 626 (e.g., one or more wireless antennas for different communication protocols, such as a cellular antenna, a Bluetooth antenna, etc.). In at least one embodiment, network interface 624 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 40 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 600 information about vehicles in proximity to vehicle 600 (e.g., vehicles in front of, on a side of, and/or behind vehicle 400). In at least one embodiment, such aforementioned functionality may be part of a cooperative adaptive cruise control functionality of vehicle 600.

In at least one embodiment, network interface 624 may include an SoC that provides modulation and demodulation functionality and enables controller(s) 636 to communicate over wireless networks. In at least one embodiment, network interface 624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 600 may further include data store(s) 628 which may include, without limitation, off-chip (e.g., off SoC(s) 404) storage. In at least one embodiment, data store(s) 628 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 600 may further include GNSS sensor(s) 658 (e.g., GPS and/or assisted GPS sensors), to assist in mapping, perception, occupancy grid generation, and/or path planning functions. In at least one embodiment, any number of GNSS sensor(s) 658 may be used, including, for example and without limitation, a GPS using a USB connector with an Ethernet-to-Serial (e.g., RS-232) bridge.

In at least one embodiment, vehicle 600 may further include RADAR sensor(s) 660. In at least one embodiment, RADAR sensor(s) 660 may be used by vehicle 600 for long-range vehicle detection, even in darkness and/or severe weather conditions. In at least one embodiment, RADAR functional safety levels may be ASIL B. In at least one embodiment, RADAR sensor(s) 660 may use a CAN bus and/or bus 602 (e.g., to transmit data generated by RADAR sensor(s) 460) for control and to access object tracking data, with access to Ethernet channels to access raw data in some examples. In at least one embodiment, a wide variety of RADAR sensor types may be used. For example, and without limitation, RADAR sensor(s) 660 may be suitable for front, rear, and side RADAR use. In at least one embodiment, one or more sensor of RADAR sensors(s) 660 is a Pulse Doppler RADAR sensor.

In at least one embodiment, RADAR sensor(s) 660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 660 may help in distinguishing between static and moving objects and may be used by ADAS system 638 for emergency brake assist and forward collision warning. In at least one embodiment, sensors 460(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 600 surroundings at higher speeds with minimal interference from traffic in adjacent lanes. In at least one embodiment, another two antennae may expand field of view, making it possible to quickly detect vehicles entering or leaving a lane of vehicle 600.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 660 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 638 for blind spot detection and/or lane change assist.

In at least one embodiment, vehicle 600 may further include ultrasonic sensor(s) 662. In at least one embodiment, ultrasonic sensor(s) 662, which may be positioned at a front, a back, and/or side location of vehicle 600, may be used for parking assist and/or to create and update an occupancy grid. In at least one embodiment, a wide variety of ultrasonic sensor(s) 662 may be used, and different ultrasonic sensor(s) 662 may be used for different ranges of detection (e.g., 2.5 m, 4 m). In at least one embodiment, ultrasonic sensor(s) 662 may operate at functional safety levels of ASIL B.

In at least one embodiment, vehicle 600 may include LIDAR sensor(s) 664. In at least one embodiment, LIDAR sensor(s) 664 may be used for object and pedestrian detection, emergency braking, collision avoidance, and/or other functions. In at least one embodiment, LIDAR sensor(s) 664 may operate at functional safety level ASIL B. In at least one embodiment, vehicle 600 may include multiple LIDAR sensors 664 (e.g., two, four, six, etc.) that may use an Ethernet channel (e.g., to provide data to a Gigabit Ethernet switch).

In at least one embodiment, LIDAR sensor(s) 664 may be capable of providing a list of objects and their distances for a 360-degree field of view. In at least one embodiment, commercially available LIDAR sensor(s) 664 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 664 may include a small device that may be embedded into a front, a rear, a side, and/or a corner location of vehicle 600. In at least one embodiment, LIDAR sensor(s) 664, in such an embodiment, may provide up to a 120-degree horizontal and 35-degree vertical field-of-view, with a 200 m range even for low-reflectivity objects. In at least one embodiment, front-mounted LIDAR sensor(s) 664 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 600 up to approximately 200 m. In at least one embodiment, a flash LIDAR unit includes, without limitation, a receptor, which records laser pulse transit time and reflected light on each pixel, which in turn corresponds to a range from vehicle 600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 600 may further include IMU sensor(s) 666. In at least one embodiment, IMU sensor(s) 666 may be located at a center of a rear axle of vehicle 600. In at least one embodiment, IMU sensor(s) 666 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 666 may include, without limitation, accelerometers and gyroscopes. In at least one embodiment, such as in nine-axis applications, IMU sensor(s) 666 may include, without limitation, accelerometers, gyroscopes, and magnetometers.

In at least one embodiment, IMU sensor(s) 666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 666 may enable vehicle 600 to estimate its heading without requiring input from a magnetic sensor by directly observing and correlating changes in velocity from a GPS to IMU sensor(s) 666. In at least one embodiment, IMU sensor(s) 666 and GNSS sensor(s) 658 may be combined in a single integrated unit.

In at least one embodiment, vehicle 600 may include microphone(s) 696 placed in and/or around vehicle 600. In at least one embodiment, microphone(s) 696 may be used for emergency vehicle detection and identification, among other things.

In at least one embodiment, vehicle 600 may further include any number of camera types, including stereo camera(s) 668, wide-view camera(s) 670, infrared camera(s) 672, surround camera(s) 674, long-range camera(s) 698, mid-range camera(s) 676, and/or other camera types. In at least one embodiment, cameras may be used to capture image data around an entire periphery of vehicle 600. In at least one embodiment, which types of cameras used depends on vehicle 600. In at least one embodiment, any combination of camera types may be used to provide necessary coverage around vehicle 600. In at least one embodiment, a number of cameras deployed may differ depending on embodiment. For example, in at least one embodiment, vehicle 600 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 6A and FIG. 6B.

In at least one embodiment, vehicle 600 may further include vibration sensor(s) 642. In at least one embodiment, vibration sensor(s) 642 may measure vibrations of components of vehicle 600, such as axle(s). For example, in at least one embodiment, changes in vibrations may indicate a change in road surfaces. In at least one embodiment, when two or more vibration sensors 642 are used, differences between vibrations may be used to determine friction or slippage of road surface (e.g., when a difference in vibration is between a power-driven axle and a freely rotating axle).

In at least one embodiment, vehicle 600 may include ADAS system 638. In at least one embodiment, ADAS system 638 may include, without limitation, an SoC, in some examples. In at least one embodiment, ADAS system 638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 660, LIDAR sensor(s) 664, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 600 and automatically adjusts speed of vehicle 600 to maintain a safe distance from vehicles ahead. In at least one embodiment, a lateral ACC system performs distance keeping, and advises vehicle 600 to change lanes when necessary. In at least one embodiment, a lateral ACC is related to other ADAS applications, such as LC and CW.

In at least one embodiment, a CACC system uses information from other vehicles that may be received via network interface 624 and/or wireless antenna(s) 626 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 400), while I2V communication provides information about traffic further ahead. In at least one embodiment, a CACC system may include either or both I2V and V2V information sources. In at least one embodiment, given information of vehicles ahead of vehicle 600, a CACC system may be more reliable, and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 660, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object and may automatically apply brakes if a driver does not take corrective action within a specified time or distance parameter. In at least one embodiment, AEB system may use front-facing camera(s) and/or RADAR sensor(s) 660, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 600 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 600 if vehicle 600 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 600 is backing up. In at least one embodiment, an RCTW system includes an AEB system to ensure that vehicle brakes are applied to avoid a crash. In at least one embodiment, an RCTW system may use one or more rear-facing RADAR sensor(s) 660, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 600 itself decides, in case of conflicting results, whether to heed result from a primary computer or a secondary computer (e.g., a first controller or a second controller of controllers 436). For example, in at least one embodiment, ADAS system 638 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 638 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 604.

In at least one embodiment, ADAS system 638 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 638 may be fed into a primary computer's perception block and/or a primary computer's dynamic driving task block. For example, in at least one embodiment, if ADAS system 638 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 600 may further include infotainment SoC 630 (e.g., an in-vehicle infotainment system (IVI)). Although illustrated and described as an SoC, infotainment system SoC 630, in at least one embodiment, may not be an SoC, and may include, without limitation, two or more discrete components. In at least one embodiment, infotainment SoC 630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 600. For example, infotainment SoC 630 could include radios, disk players, navigation systems, video players, USB and Bluetooth connectivity, carputers, in-car entertainment, WiFi, steering wheel audio controls, hands free voice control, a heads-up display ("HUD"), HMI display 634, a telematics device, a control panel (e.g., for controlling and/or interacting with various components, features, and/or systems), and/or other components. In at least one embodiment, infotainment SoC 630 may further be used to provide information (e.g., visual and/or audible) to user(s) of vehicle 600, such as information from ADAS system 638, autonomous driving information such as planned vehicle maneuvers, trajectories, surrounding environment information (e.g., intersection information, vehicle information, road information, etc.), and/or other information.

In at least one embodiment, infotainment SoC 630 may include any amount and type of GPU functionality. In at least one embodiment, infotainment SoC 630 may communicate over bus 602 with other devices, systems, and/or components of vehicle 600. In at least one embodiment, infotainment SoC 630 may be coupled to a supervisory MCU such that a GPU of an infotainment system may perform some self-driving functions in event that primary controller(s) 636 (e.g., primary and/or backup computers of vehicle 400) fail. In at least one embodiment, infotainment SoC 630 may put vehicle 600 into a chauffeur to safe stop mode, as described herein.

In at least one embodiment, vehicle 600 may further include instrument cluster 632 (e.g., a digital dash, an electronic instrument cluster, a digital instrument panel, etc.). In at least one embodiment, instrument cluster 632 may include, without limitation, a controller and/or supercomputer (e.g., a discrete controller or supercomputer). In at least one embodiment, instrument cluster 632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 630 and instrument cluster 632. In at least one embodiment, instrument cluster 632 may be included as part of infotainment SoC 630, or vice versa.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system architecture of FIG. 6C for performing image processing operations, including white balancing operations.

Figure 6D:
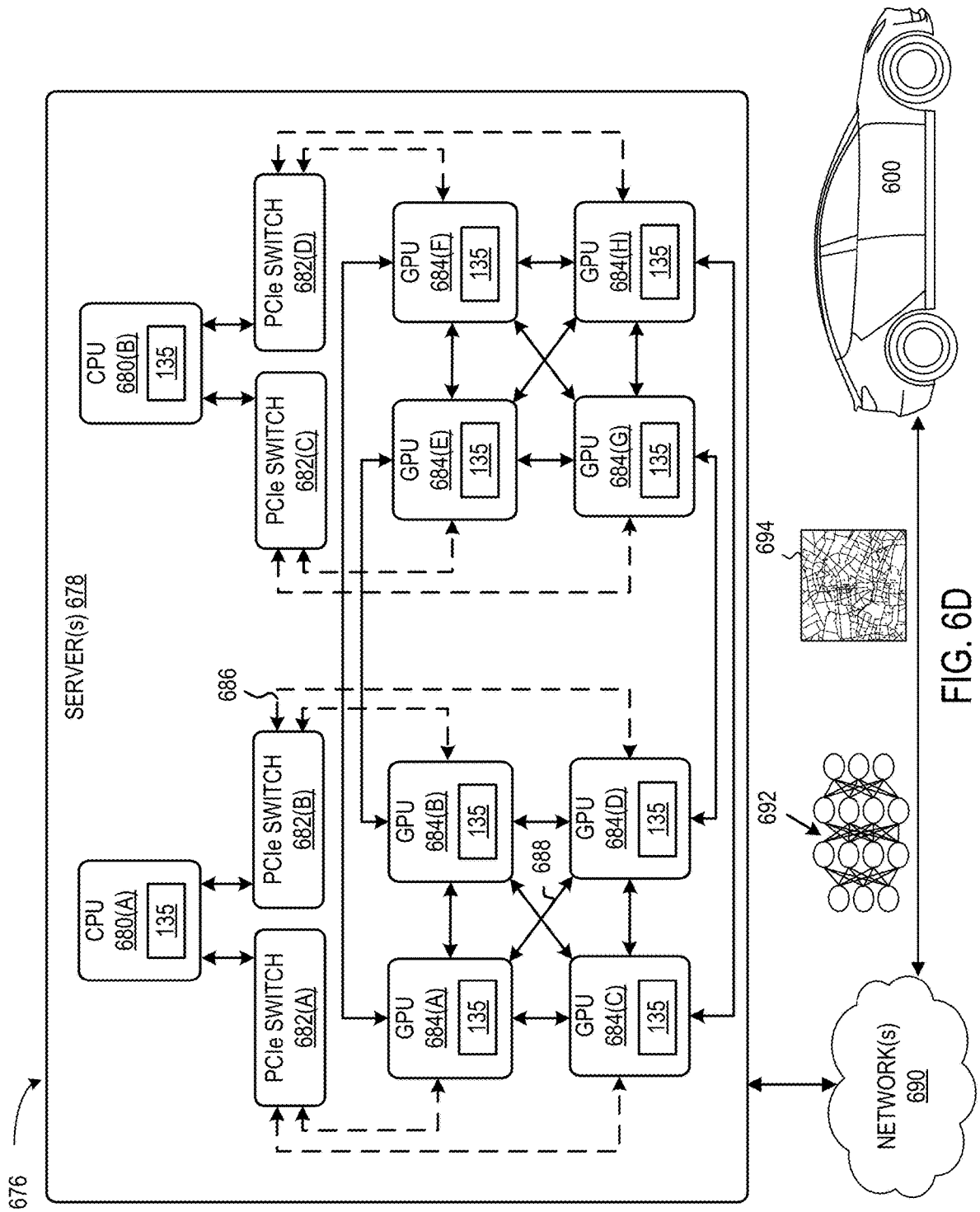
FIG. 6D is a diagram illustrating a system for communication between cloud-based server(s) and the autonomous vehicle of FIG. 6A, according to at least one embodiment.

FIG. 6D is a diagram of a system 676 for communication between cloud-based server(s) and autonomous vehicle 600 of FIG. 6A, according to at least one embodiment. In at least one embodiment, system 676 may include, without limitation, server(s) 678, network(s) 690, and any number and type of vehicles, including vehicle 600. In at least one embodiment, server(s) 678 may include, without limitation, a plurality of GPUs 484(A)-484(H) (collectively referred to herein as GPUs 484), PCIe switches 482(A)-482(D) (collectively referred to herein as PCIe switches 482), and/or CPUs 480(A)-480(B) (collectively referred to herein as CPUs 480). In at least one embodiment, GPUs 684, CPUs 680, and PCIe switches 682 may be interconnected with high-speed interconnects such as, for example and without limitation, NVLink interfaces 688 developed by NVIDIA and/or PCIe connections 686. In at least one embodiment, GPUs 684 are connected via an NVLink and/or NVSwitch SoC and GPUs 684 and PCIe switches 682 are connected via PCIe interconnects. Although eight GPUs 684, two CPUs 680, and four PCIe switches 682 are illustrated, this is not intended to be limiting. In at least one embodiment, each of server(s) 678 may include, without limitation, any number of GPUs 684, CPUs 680, and/or PCIe switches 682, in any combination. For example, in at least one embodiment, server(s) 678 could each include eight, sixteen, thirty-two, and/or more GPUs 684.

In at least one embodiment, server(s) 678 may receive, over network(s) 690 and from vehicles, image data representative of images showing unexpected or changed road conditions, such as recently commenced road-work. In at least one embodiment, server(s) 678 may transmit, over network(s) 690 and to vehicles, neural networks 692, updated or otherwise, and/or map information 694, including, without limitation, information regarding traffic and road conditions. In at least one embodiment, updates to map information 694 may include, without limitation, updates for HD map 622, such as information regarding construction sites, potholes, detours, flooding, and/or other obstructions. In at least one embodiment, neural networks 692, and/or map information 694 may have resulted from new training and/or experiences represented in data received from any number of vehicles in an environment, and/or based at least in part on training performed at a data center (e.g., using server(s) 678 and/or other servers).

In at least one embodiment, server(s) 678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 490), and/or machine learning models may be used by server(s) 678 to remotely monitor vehicles.

In at least one embodiment, server(s) 678 may receive data from vehicles and apply data to up-to-date real-time neural networks for real-time intelligent inferencing. In at least one embodiment, server(s) 678 may include deep-learning supercomputers and/or dedicated AI computers powered by GPU(s) 684, such as a DGX and DGX Station machines developed by NVIDIA. However, in at least one embodiment, server(s) 678 may include deep learning infrastructure that uses CPU-powered data centers.

In at least one embodiment, deep-learning infrastructure of server(s) 678 may be capable of fast, real-time inferencing, and may use that capability to evaluate and verify health of processors, software, and/or associated hardware in vehicle 600. For example, in at least one embodiment, deep-learning infrastructure may receive periodic updates from vehicle 600, such as a sequence of images and/or objects that vehicle 600 has located in that sequence of images (e.g., via computer vision and/or other machine learning object classification techniques). In at least one embodiment, deep-learning infrastructure may run its own neural network to identify objects and compare them with objects identified by vehicle 600 and, if results do not match and deep-learning infrastructure concludes that AI in vehicle 600 is malfunctioning, then server(s) 678 may transmit a signal to vehicle 600 instructing a fail-safe computer of vehicle 600 to assume control, notify passengers, and complete a safe parking maneuver.

In at least one embodiment, server(s) 678 may include GPU(s) 684 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) implementing processing logic 135 are used to perform one or more embodiments. Details regarding processing logic 135 are provided herein in conjunction with FIG. 1.

Figure 7:
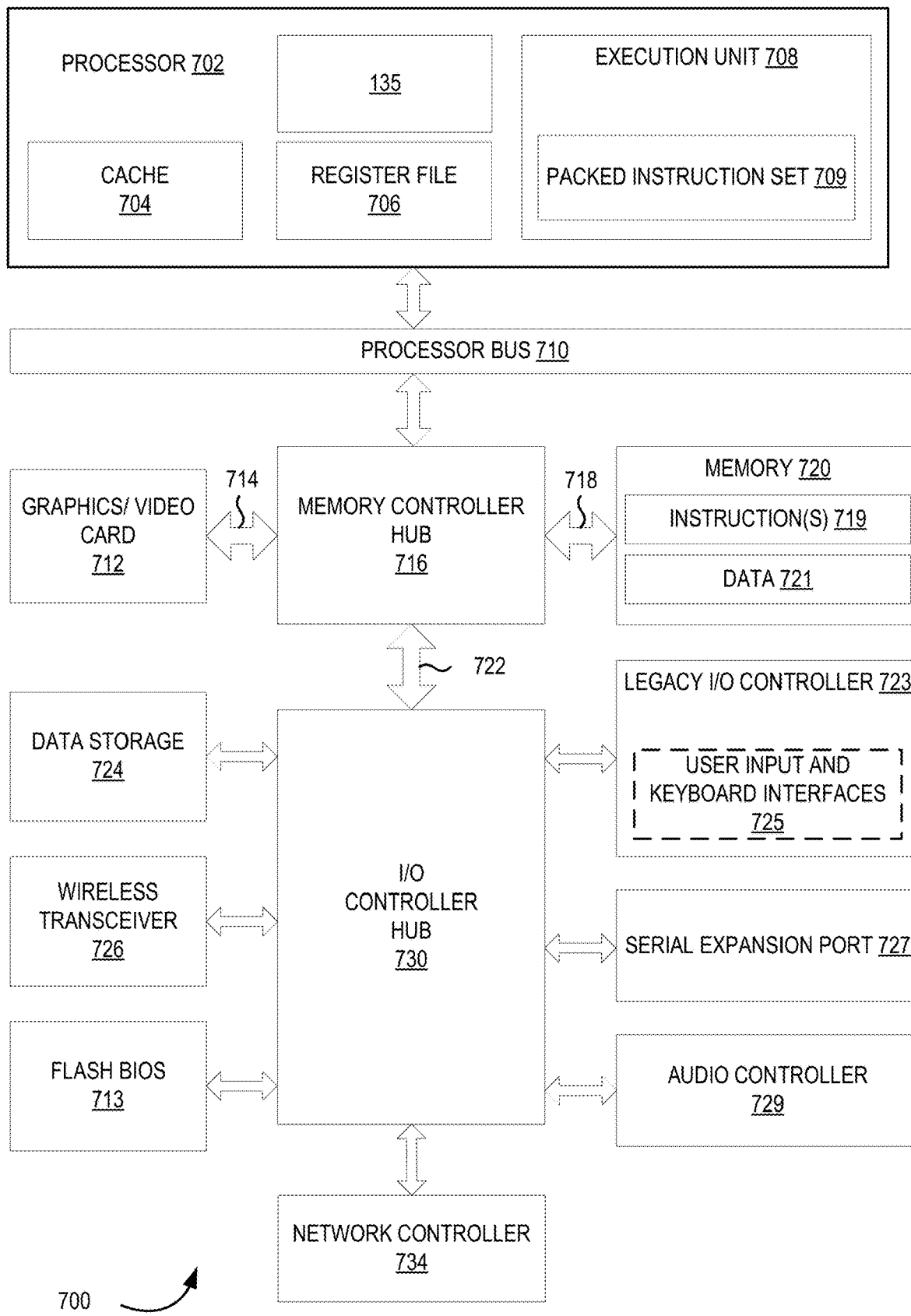
FIG. 7 is a block diagram illustrating a computer system, according to at least one embodiment.

FIG. 7 is a block diagram illustrating an example computer system, which may be a system with interconnected devices and components, a system-on-a-chip (SOC) or some combination thereof formed with a processor that may include execution units to execute an instruction, according to at least one embodiment. In at least one embodiment, a computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 700 may include, without limitation, processor 702 that may include, without limitation, one or more execution units 708 to perform image processing and white balancing according to techniques described herein. In at least one embodiment, computer system 700 is a single processor desktop or server system, but in another embodiment, computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, a register file 706 may store different types of data in various registers including, without limitation, integer registers, floating point registers, status registers, and an instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor, along with associated circuitry to execute instructions, operations used by many multimedia applications may be performed using packed data in processor 702. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be a Dynamic Random Access Memory ("DRAM") device, a Static Random Access Memory ("SRAM") device, a flash memory device, or another memory device. In at least one embodiment, memory 720 may store instruction(s) 719 and/or data 721 represented by data signals that may be executed by processor 702.

In at least one embodiment, a system logic chip may be coupled to processor bus 710 and memory 720. In at least one embodiment, a system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O interface 722. In at least one embodiment, a system logic chip may provide a graphics port for coupling to a graphics controller. In at least one embodiment, MCH 716 may be coupled to memory 720 through high bandwidth memory path 718 and a graphics/video card 712 may be coupled to MCH 716 through an Accelerated Graphics Port ("AGP") interconnect 714.

In at least one embodiment, computer system 700 may use system I/O interface 722 as a proprietary hub interface bus to couple MCH 716 to an I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as a Universal Serial Bus ("USB") port, and a network controller 734. In at least one embodiment, data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an example SoC. In at least one embodiment, devices illustrated in FIG. 7 may be interconnected with proprietary interconnects, standardized interconnects (e.g., PCIe) or some combination thereof. In at least one embodiment, one or more components of computer system 700 are interconnected using compute express link (CXL) interconnects.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system of FIG. 7 for performing image processing operations, including white balancing operations.

Figure 8:
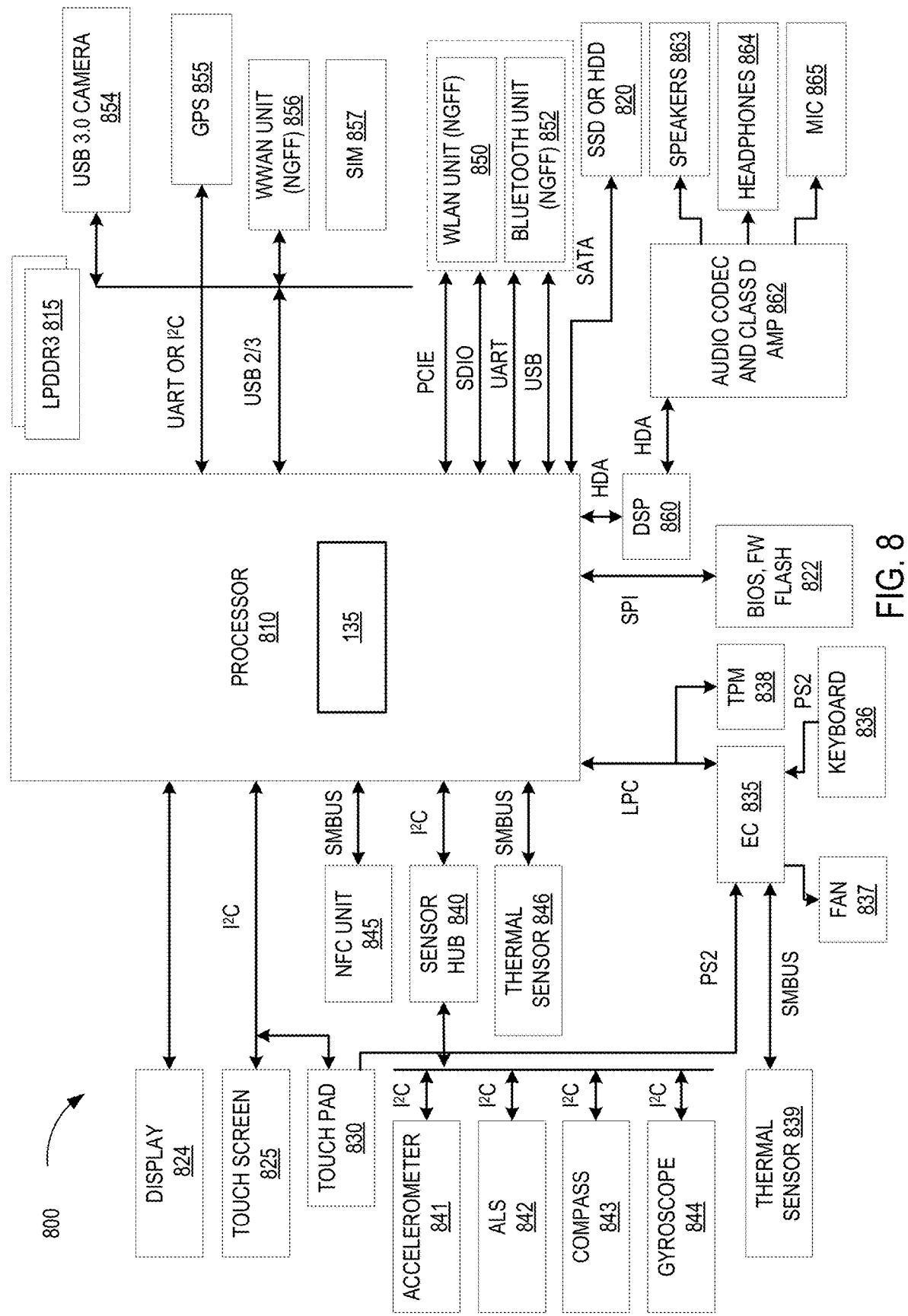
FIG. 8 is a block diagram illustrating a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 800 may include, without limitation, processor 810 communicatively coupled to any suitable number or kind of components, peripherals, modules, or devices. In at least one embodiment, processor 810 is coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an example SoC. In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 6 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) unit 855, a camera ("USB 3.0 camera") 854 such as a USB 3.0 camera, and/or a Low Power Double Data Rate ("LPDDR") memory unit ("LPDDR3") 815 implemented in, for example, an LPDDR3 standard. These components may each be implemented in any suitable manner.

In at least one embodiment, other components may be communicatively coupled to processor 810 through components described herein. In at least one embodiment, an accelerometer 841, an ambient light sensor ("ALS") 842, a compass 843, and a gyroscope 844 may be communicatively coupled to sensor hub 840. In at least one embodiment, a thermal sensor 839, a fan 837, a keyboard 836, and touch pad 830 may be communicatively coupled to EC 835. In at least one embodiment, speakers 863, headphones 864, and a microphone ("mic") 865 may be communicatively coupled to an audio unit ("audio codec and class D amp") 862, which may in turn be communicatively coupled to DSP 860. In at least one embodiment, audio unit 862 may include, for example and without limitation, an audio coder/decoder ("codec") and a class D amplifier. In at least one embodiment, a SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the electronic device of FIG. 8 for performing image processing operations, including white balancing operations.

Figure 9:
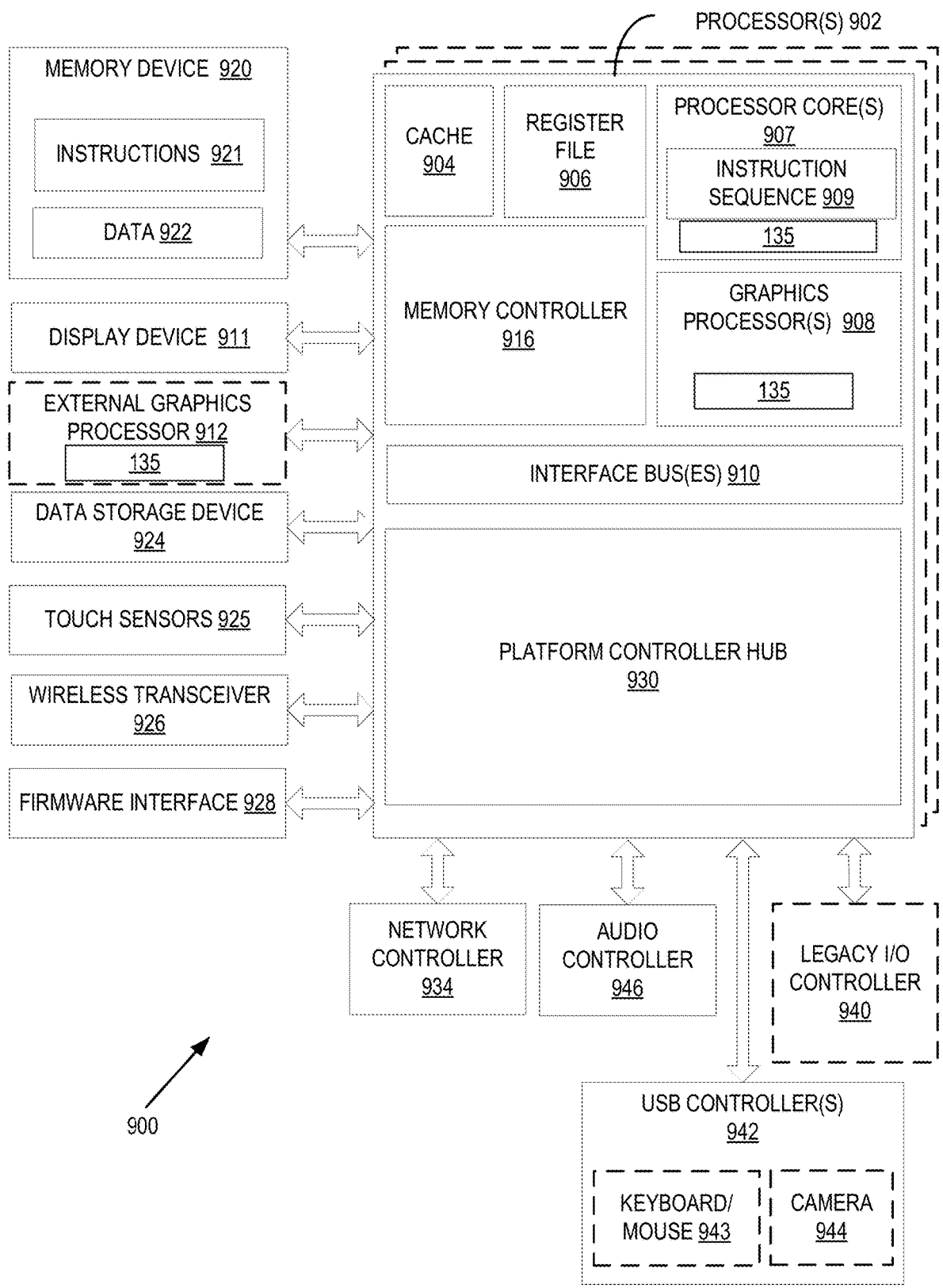
FIG. 9 illustrates at least portions of a graphics processor, according to one or more embodiments.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, or embedded devices.

In at least one embodiment, system 900 can include, or be incorporated within a server-based gaming platform, a game console, including a game and media console, a mobile gaming console, a handheld game console, or an online game console. In at least one embodiment, system 900 is a mobile phone, a smart phone, a tablet computing device or a mobile Internet device. In at least one embodiment, processing system 900 can also include, couple with, or be integrated within a wearable device, such as a smart watch wearable device, a smart eyewear device, an augmented reality device, or a virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction sequence 909. In at least one embodiment, instruction sequence 909 may facilitate Complex Instruction Set Computing (CISC), Reduced Instruction Set Computing (RISC), or computing via a Very Long Instruction Word (VLIW). In at least one embodiment, processor cores 907 may each process a different instruction sequence 909, which may include instructions to facilitate emulation of other instruction sequences. In at least one embodiment, processor core 907 may also include other processing devices, such a Digital Signal Processor (DSP).

In at least one embodiment, processor 902 includes a cache memory 904. In at least one embodiment, processor 902 can have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, a register file 906 is additionally included in processor 902, which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910 can be a processor bus, such as a version of a Direct Media Interface (DMI) bus. In at least one embodiment, interface bus 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, a memory device 920 can be a dynamic random access memory (DRAM) device, a static random access memory (SRAM) device, flash memory device, phase-change memory device, or some other memory device having suitable performance to serve as process memory. In at least one embodiment, memory device 920 can operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 can connect to processor(s) 902. In at least one embodiment, display device 911 can include one or more of an internal display device, as in a mobile electronic device or a laptop device, or an external display device attached via a display interface (e.g., DisplayPort, etc.). In at least one embodiment, display device 911 can include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 can connect via a storage interface (e.g., SATA) or via a peripheral bus, such as a Peripheral Component Interconnect bus (e.g., PCI, PCI Express). In at least one embodiment, touch sensors 925 can include touch screen sensors, pressure sensors, or fingerprint sensors. In at least one embodiment, wireless transceiver 926 can be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and can be, for example, a unified extensible firmware interface (UEFI). In at least one embodiment, network controller 934 can enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system 900. In at least one embodiment, platform controller hub 930 can also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 can include an external memory controller 916 and platform controller hub 930, which may be configured as a memory controller hub and peripheral controller hub within a system chipset that is in communication with processor(s) 902.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system of FIG. 9 for performing image processing operations, including white balancing operations.

Figure 10:
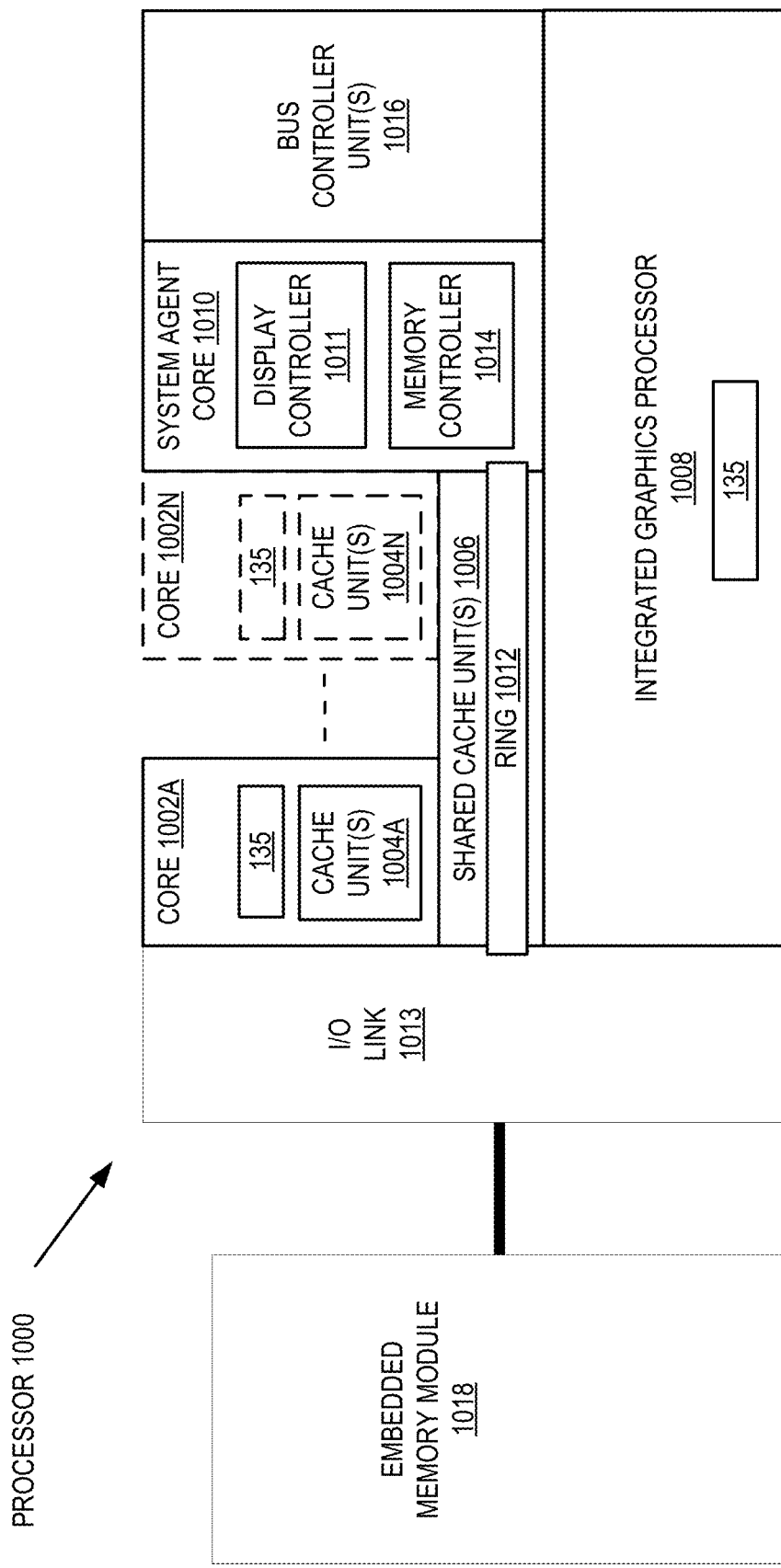
FIG. 10 illustrates at least portions of a graphics processor, according to one or more embodiments.

FIG. 10 is a block diagram of a processor 1000 having one or more processor cores 1002A-1002N, an integrated memory controller 1014, and an integrated graphics processor 1008, according to at least one embodiment. In at least one embodiment, processor 1000 can include additional cores up to and including additional core 1002N represented by dashed lined boxes. In at least one embodiment, each of processor cores 1002A-1002N includes one or more internal cache units 1004A-1004N. In at least one embodiment, each processor core also has access to one or more shared cached units 1006.

In at least one embodiment, internal cache units 1004A-1004N and shared cache units 1006 represent a cache memory hierarchy within processor 1000. In at least one embodiment, cache memory units 1004A-1004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1004N.

In at least one embodiment, processor 1000 may also include a set of one or more bus controller units 1016 and a system agent core 1010. In at least one embodiment, bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1014 to manage access to various external memory devices (not shown).

In at least one embodiment, one or more of processor cores 1002A-1002N include support for simultaneous multi-threading. In at least one embodiment, system agent core 1010 includes components for coordinating and operating cores 1002A-1002N during multi-threaded processing. In at least one embodiment, system agent core 1010 may additionally include a power control unit (PCU), which includes logic and components to regulate one or more power states of processor cores 1002A-1002N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1014. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring-based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 2113.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1002N and graphics processor 1008 use embedded memory module 1018 as a shared Last Level Cache.

In at least one embodiment, processor cores 1002A-1002N are homogeneous cores executing a common instruction set architecture. In at least one embodiment, processor cores 1002A-1002N are heterogeneous in terms of instruction set architecture (ISA), where one or more of processor cores 1002A-1002N execute a common instruction set, while one or more other cores of processor cores 1002A-1002N executes a subset of a common instruction set or a different instruction set. In at least one embodiment, processor cores 1002A-1002N are heterogeneous in terms of microarchitecture, where one or more cores having a relatively higher power consumption couple with one or more power cores having a lower power consumption. In at least one embodiment, processor 1000 can be implemented on one or more chips or as an SoC integrated circuit.

Processing logic 135 may be used to perform image processing operations, including white balancing operations, associated with one or more embodiments. Details regarding processing logic 135 are provided herein in conjunction with FIG. 1. In at least one embodiment, processing logic 135 may be incorporated into graphics processor 1008. For example, in at least one embodiment, image processing and/or white balancing techniques described herein may use one or more of ALUs embodied in a 3D pipeline, graphics core(s) 1002, shared function logic, or other logic in FIG. 10. Moreover, in at least one embodiment, image processing and/or white balancing operations described herein may be done using logic other than logic illustrated in FIG. 1. In at least one embodiment, parameters may be stored in on-chip or off-chip memory and/or registers (shown or not shown) that configure ALUs of processor 1000 to perform one or more image processing and/or white balancing techniques described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   estimating a scene brightness of a scene depicted in an image, the estimated scene brightness being based at least on a measure of one or more color components of the image;
   determining a chromaticity weighting function to apply to the image based at least on the estimated scene brightness of the scene depicted in the image;
   estimating at least one illuminant color corresponding to the scene by applying the chromaticity weighting function to adjust a contribution of one or more portions of the image; and
   adjusting one or more values corresponding to the image based at least on the at least one illuminant color.

2. The method of claim 1, wherein the chromaticity weighting function comprises a weighting distribution around an approximated Planckian Locus.

3. The method of claim 2, wherein the weighting distribution is parameterized by at least one of a color temperature or a tint.

4. The method of claim 1, wherein:
   the chromaticity weighting function comprises a plurality of weighting distributions;
   one or more individual weighting distributions of the plurality of weighting distributions are associated with a respective scene brightness; and
   the determining the chromaticity weighting function comprises:
   determining the estimated scene brightness of the scene depicted by the image; and
   determining a weighting distribution from the plurality of weighting distributions based at least on the estimated scene brightness.

5. The method of claim 4, wherein:
   the image comprises one or more pixels;
   one or more individual pixels of the one or more pixels comprise one or more values corresponding to at least one of one or more color channels or a luminance channel; and
   the estimated scene brightness is determined based at least on the one or more values of the one or more pixels.

6. The method of claim 1, wherein the applying the chromaticity weighting function comprises:
   dividing the image into one or more windows;
   computing an average color for at least one individual window of the one or more windows;
   converting the average color of the at least one individual window into a chromaticity color space to obtain an average chromaticity for the at least one individual window;
   determining a weighting factor to be applied to the at least one individual window based on the average chromaticity of the at least one individual window;
   calculating an image color as a weighted average of the average color for the one or more windows using respective weighting factors determined for the one or more windows;
   converting the image color to the chromaticity color space to obtain an image chromaticity; and
   projecting the image chromaticity onto an approximated Planckian Locus to obtain the at least one illuminant color.

7. The method of claim 1, wherein the adjusting the one or more values corresponding to the image based at least on the at least one illuminant color comprises:
   determining one or more corrective gains for two or more color channels of the image based at least on the illuminant color; and
   applying the one or more corrective gains to respective color channels of the image.

8. A system comprising:
   one or more processing units to perform operations comprising:
   estimating a scene brightness of a scene depicted in an image, the estimated scene brightness being based at least on a measure of one or more color components of the image;
   determining a chromaticity weighting function to apply to the image based at least on the estimated scene brightness of the scene depicted in the image;
   estimating at least one illuminant color corresponding to the scene by applying the chromaticity weighting function to adjust a contribution of one or more portions of the image; and
   adjusting one or more values corresponding to the image based at least on the at least one illuminant color.

9. The system of claim 8, wherein the chromaticity weighting function comprises a weighting distribution around an approximated Planckian Locus.

10. The system of claim 9, wherein the weighting distribution is parameterized by at least one of a color temperature or a tint.

11. The system of claim 8:
    wherein the chromaticity weighting function comprises a plurality of weighting distributions;
    one or more individual weighting distributions of the plurality of weighting distributions are associated with a respective scene brightness; and the determining the chromaticity weighting function comprises:
   determining the estimated scene brightness of the scene depicted by the image; and
   determining a weighting distribution from the plurality of weighting distributions based at least on the estimated scene brightness.

12. The system of claim 11, wherein:
the image comprises a plurality of pixels;
one or more individual pixels of the one or more pixels comprise one or more values corresponding to at least one of one or more color channels or a luminance channel; and
the estimated scene brightness is determined based at least on the one or more values of the one or more pixels.

13. The system of claim 8, wherein the applying the chromaticity weighting function comprises:
   dividing the image into one or more windows;
   computing an average color for at least one individual window of the one or more windows;
   converting the average color of the at least one individual window into a chromaticity color space to obtain an average chromaticity for the at least one individual window;
   determining a weighting factor to be applied to the at least one individual window based on the average chromaticity of the at least one individual window;
   calculating an image color as a weighted average of the average color for the one or more windows using respective weighting factors determined for the one or more windows;
   converting the image color to the chromaticity color space to obtain an image chromaticity; and
   projecting the image chromaticity onto an approximated Planckian Locus to obtain the at least one illuminant color.

14. The system of claim 8, wherein the adjusting the one or more values corresponding to the image based at least on the at least one illuminant color comprises:
   determining one or more corrective gains for two or more color channels of the image based at least on the illuminant color; and
   applying the one or more corrective gains to respective color channels of the image.

15. The system of claim 8, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for presenting one or more of virtual reality content, augmented reality content, or mixed reality content;
   a system for hosting one or more real-time streaming applications;
   a system for performing deep learning operations;
   a system implemented using an edge device;
   a system implemented using a robot;
   a system for performing conversational AI operations;
   a system for generating synthetic data;
   a system incorporating one or more virtual machines (VMs);
   a system implemented at least partially in a data center; or
   a system implemented at least partially using cloud computing resources.

16. A processor comprising:
one or more processing units to perform operations comprising:
   estimating a scene brightness of an image, the estimated scene brightness being based at least on a measure of one or more color components of the image;
   determining a chromaticity weighting function to apply to the image based at least on the estimated scene brightness of the image;
   applying the chromaticity weighting function to adjust a contribution of one or more portions of the image in estimating an illuminant color of the image; and
   adjusting one or more values corresponding to the image based at least on the illuminant color.

17. The processor of claim 16:
wherein the chromaticity weighting function comprises a plurality of weighting distributions;
one or more individual weighting distributions of the plurality of weighting distributions are associated with a respective scene brightness; and
the determining the chromaticity weighting function comprises:
   determining the estimated scene brightness of the scene depicted by the image; and
   determining a weighting distribution from the plurality of weighting distributions based at least on the estimated scene brightness.

18. The processor of claim 17, wherein:
the image comprises a plurality of pixels;
one or more individual pixels of the one or more pixels comprise one or more values corresponding to at least one of one or more color channels or a luminance channel; and
the estimated scene brightness is determined based at least on the one or more values of the one or more pixels.

19. The processor of claim 16, wherein the applying the chromaticity weighting function comprises:
   dividing the image into one or more windows;
   computing an average color for at least one individual window of the one or more windows;
   converting the average color of the at least one individual window into a chromaticity color space to obtain an average chromaticity for the at least one individual window;
   determining a weighting factor to be applied to the at least one individual window based on the average chromaticity of the at least one individual window;
   calculating an image color as a weighted average of the average color for the one or more windows using respective weighting factors determined for the one or more windows;
   converting the image color to the chromaticity color space to obtain an image chromaticity; and
   projecting the image chromaticity onto an approximated Planckian Locus to obtain the illuminant color.

20. The processor of claim 16, wherein the processor is comprised in at least one of:
   a control system for an autonomous or semi-autonomous machine;
   a perception system for an autonomous or semi-autonomous machine;
   a system for performing simulation operations;
   a system for performing digital twin operations;

a system for performing light transport simulation;
a system for performing collaborative content creation for 3D assets;
a system for presenting one or more of virtual reality content, augmented reality content, or mixed reality content;
a system for hosting one or more real-time streaming applications;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

\* \* \* \* \*